Oct. 10, 1961 F. E. CONN ET AL 3,003,566
VARIABLE PITCH PROPELLER
Filed Oct. 10, 1958 11 Sheets-Sheet 6

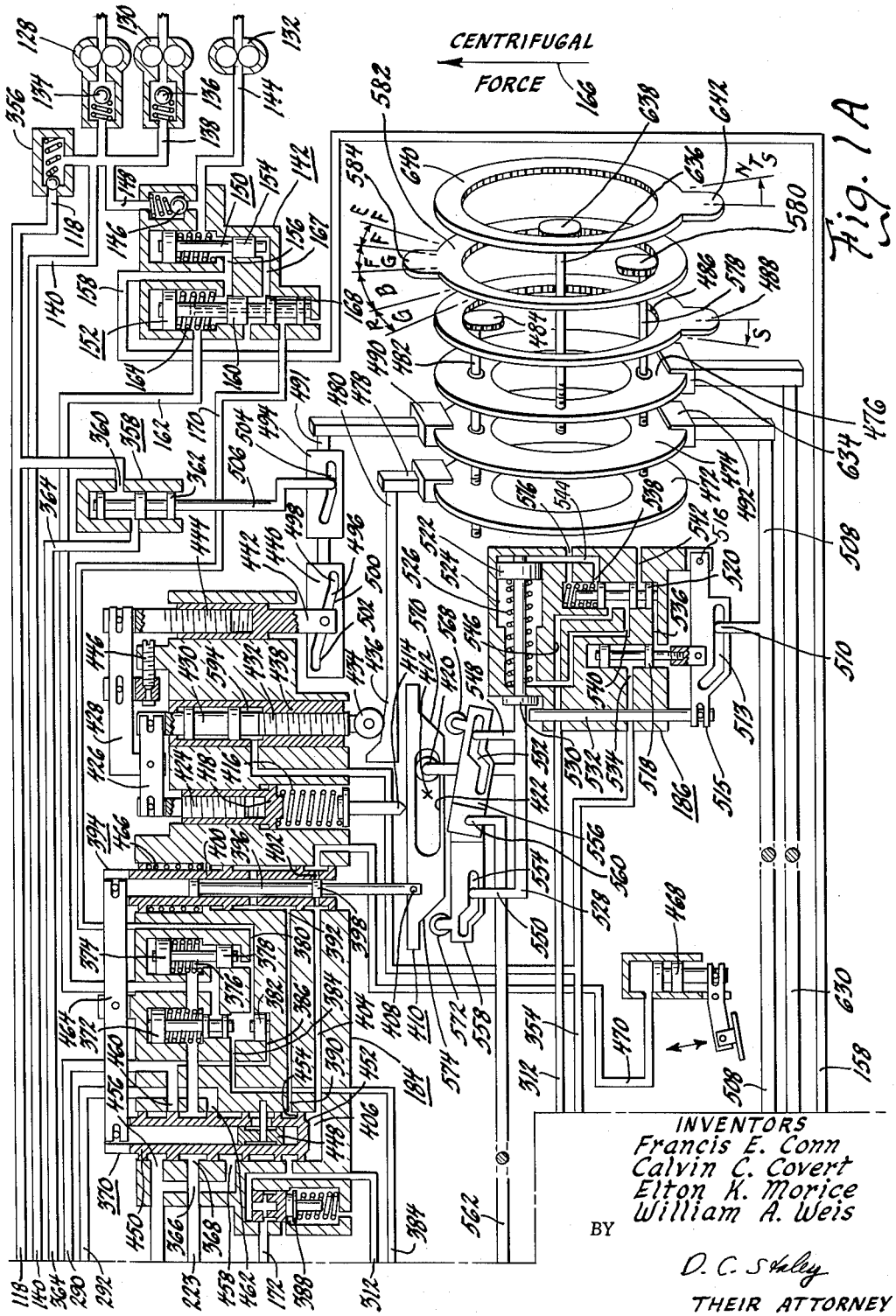

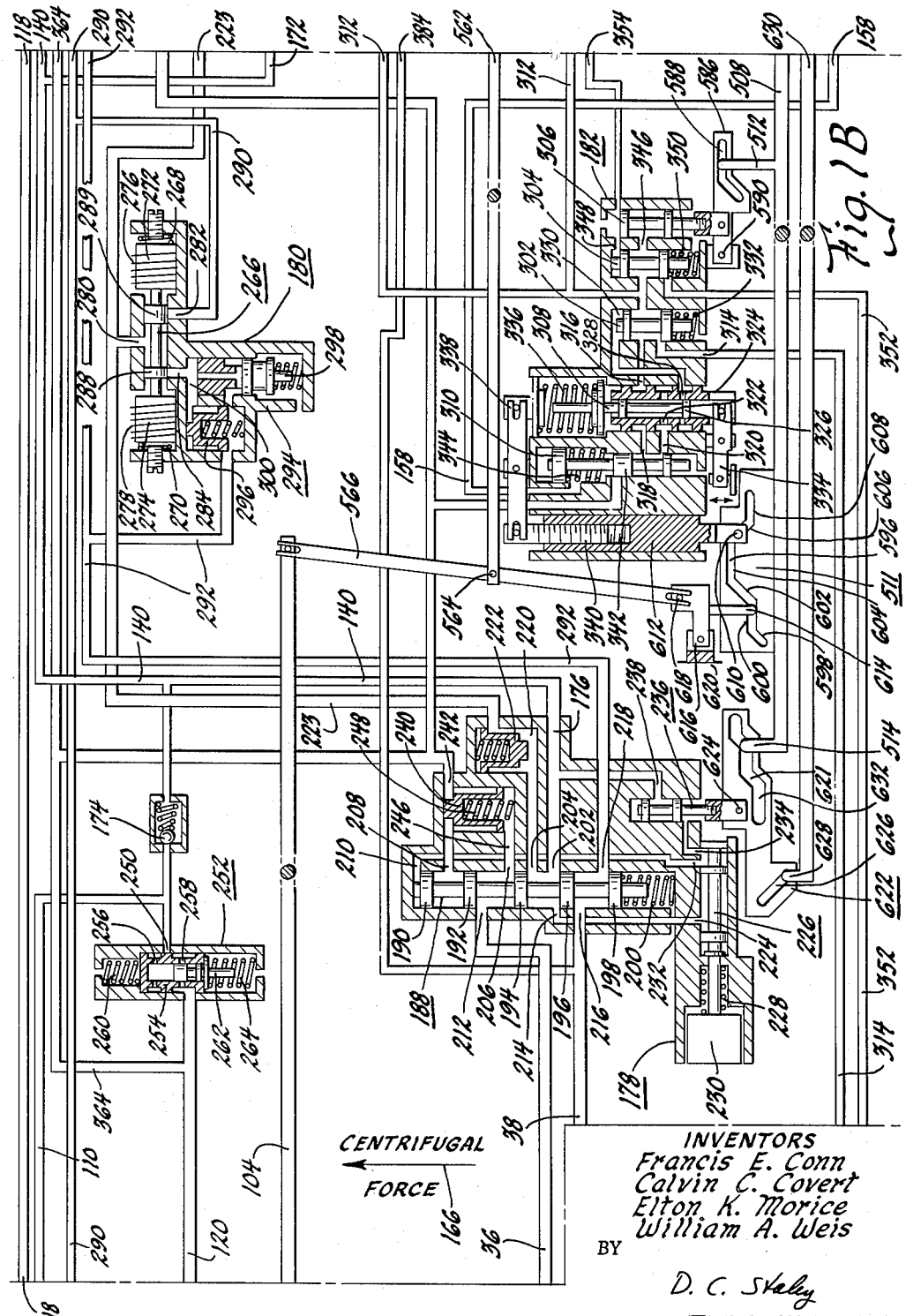

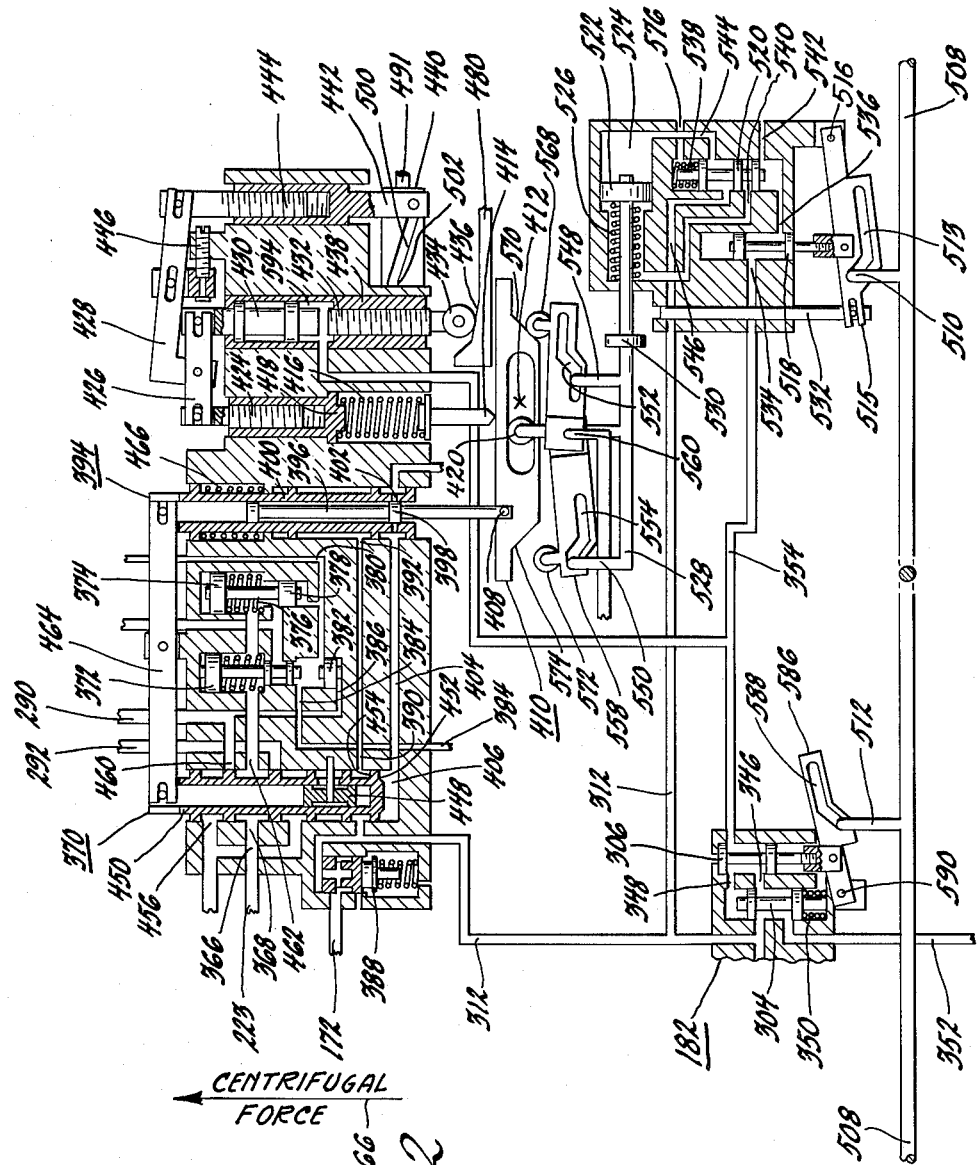

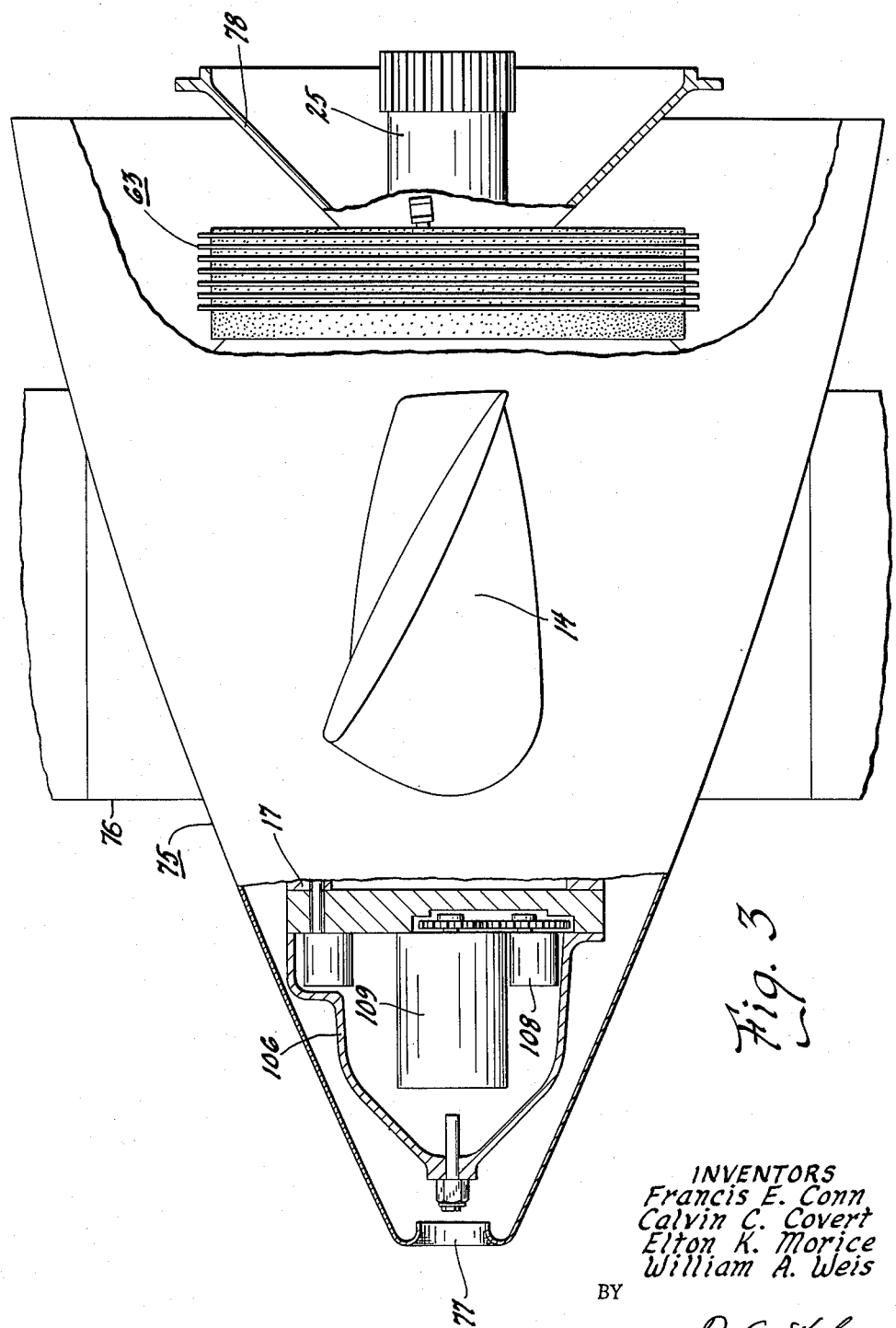

INVENTORS
Francis E. Conn
Calvin C. Covert
Elton K. Morice
William A. Weis
BY
D. C. Staley
THEIR ATTORNEY

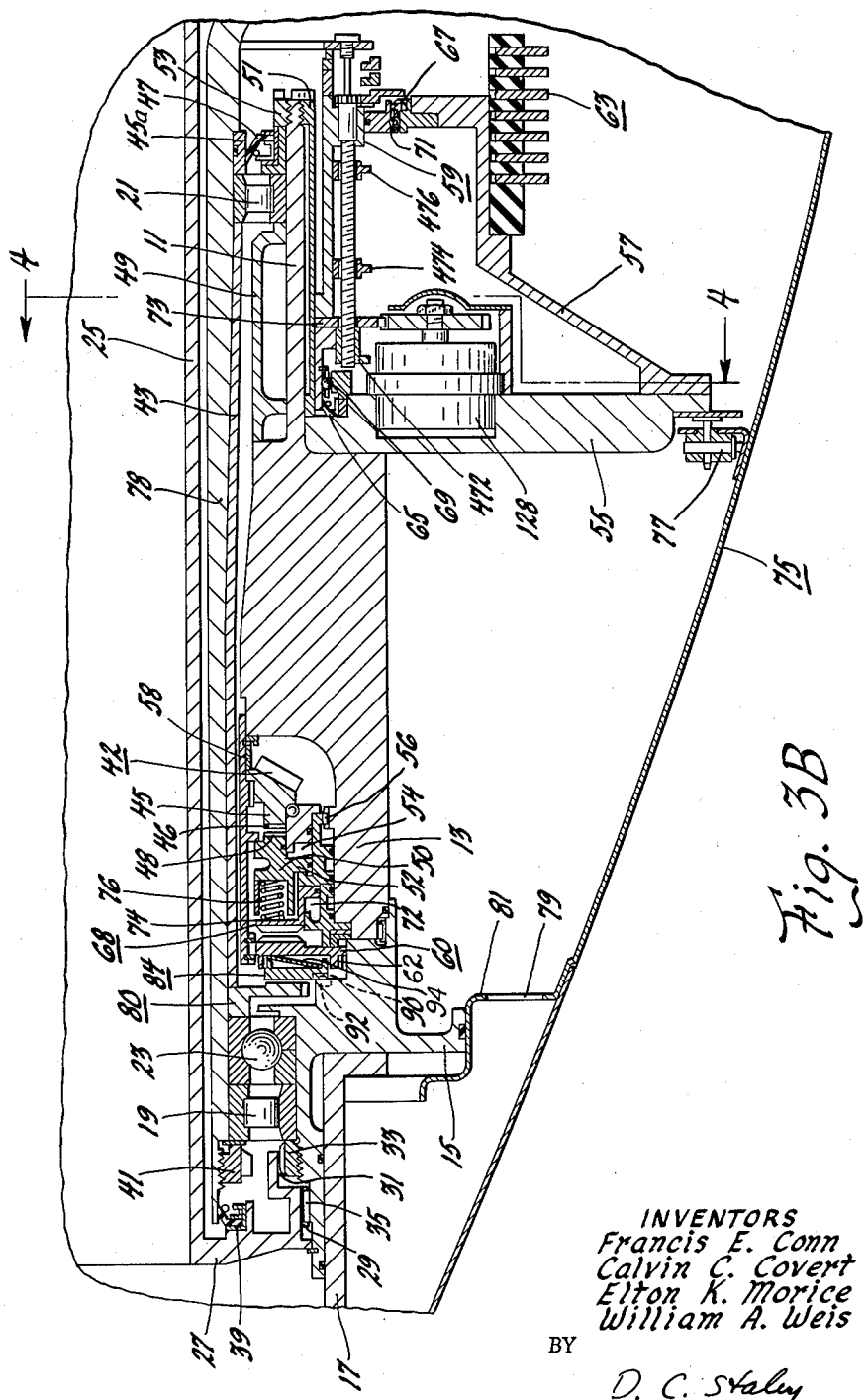

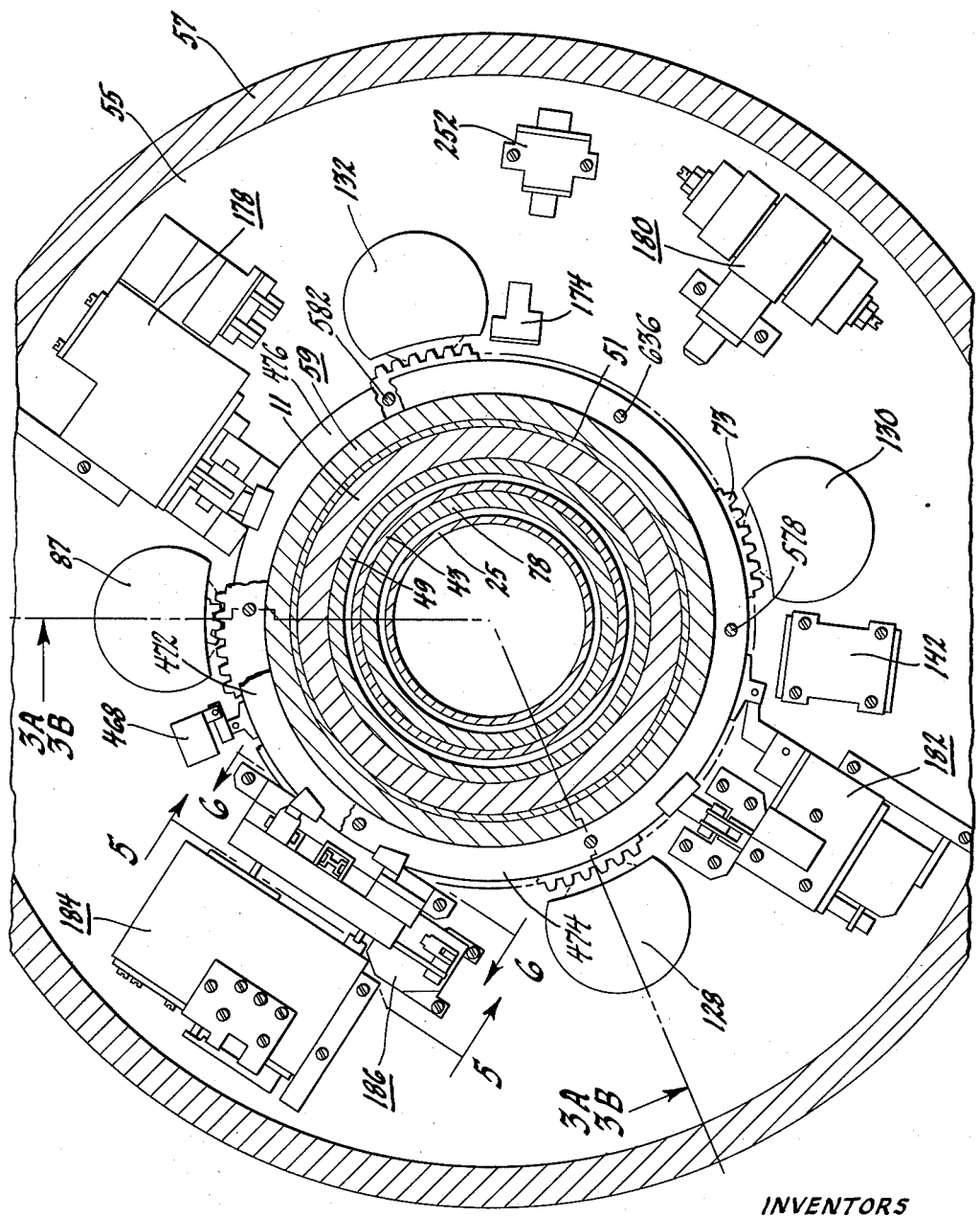

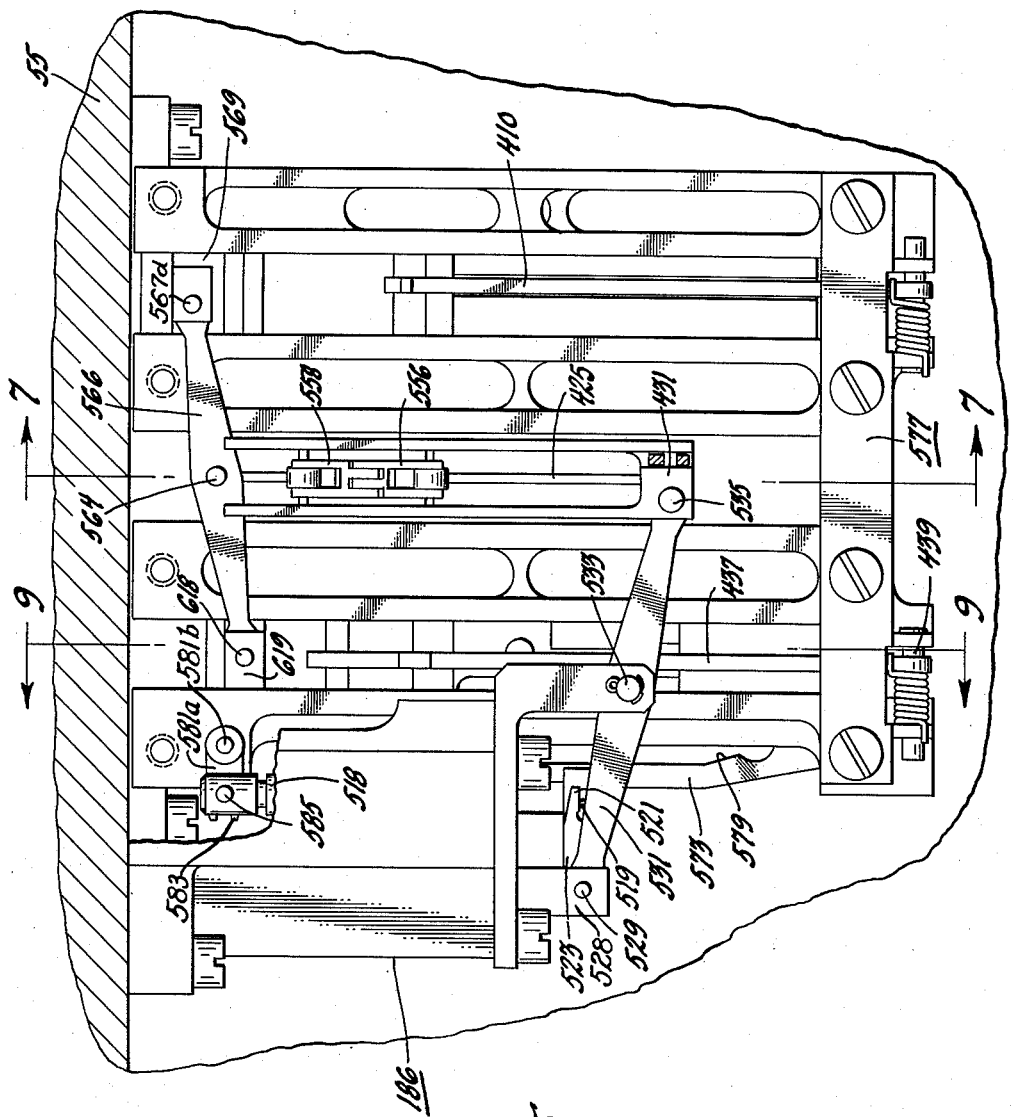

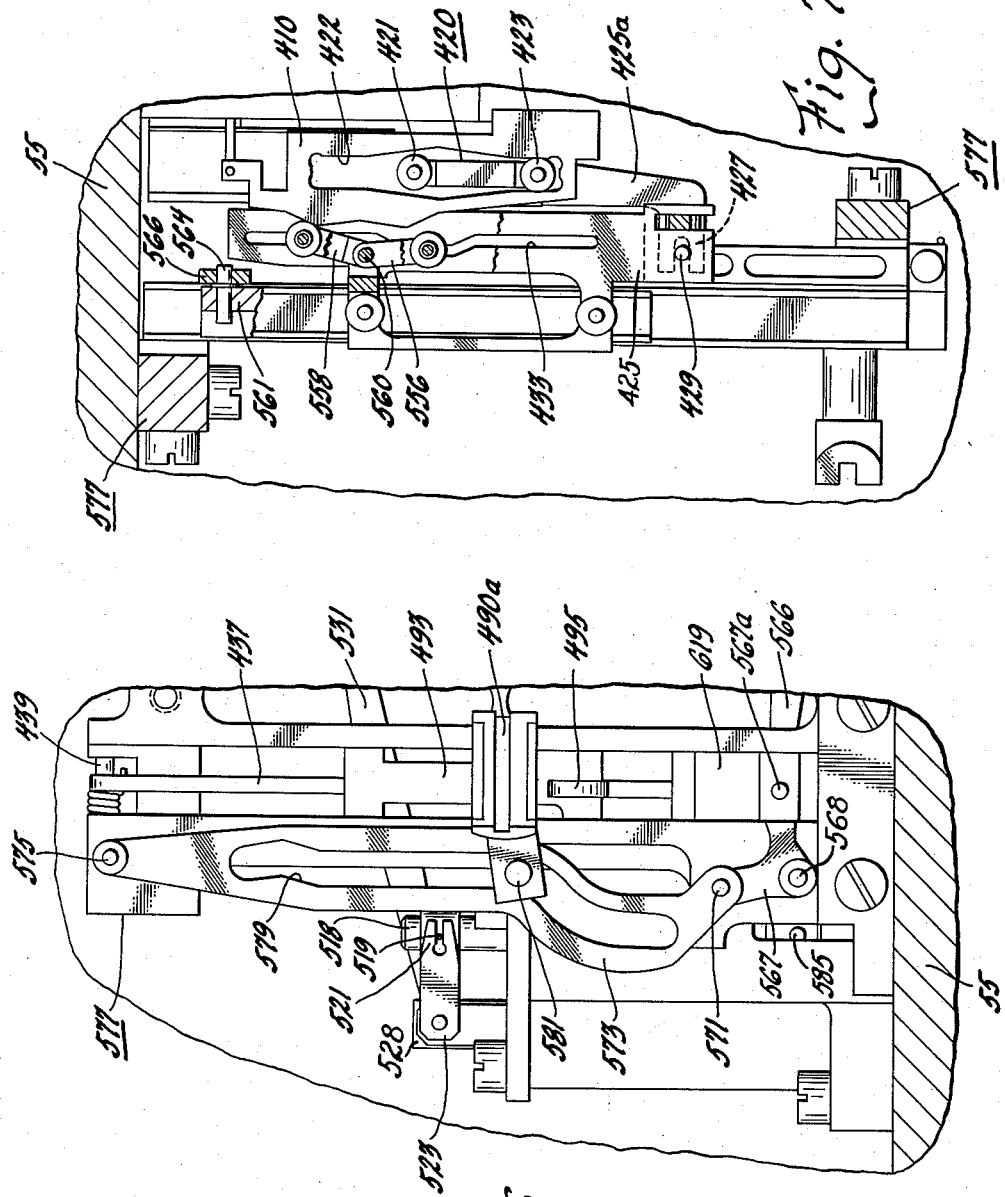

Oct. 10, 1961  F. E. CONN ET AL  3,003,566
VARIABLE PITCH PROPELLER
Filed Oct. 10, 1958  11 Sheets-Sheet 11
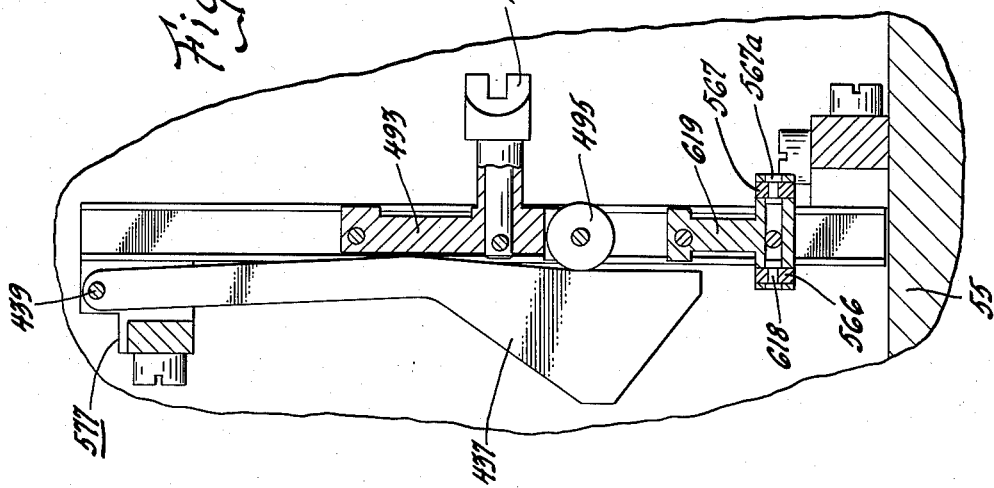
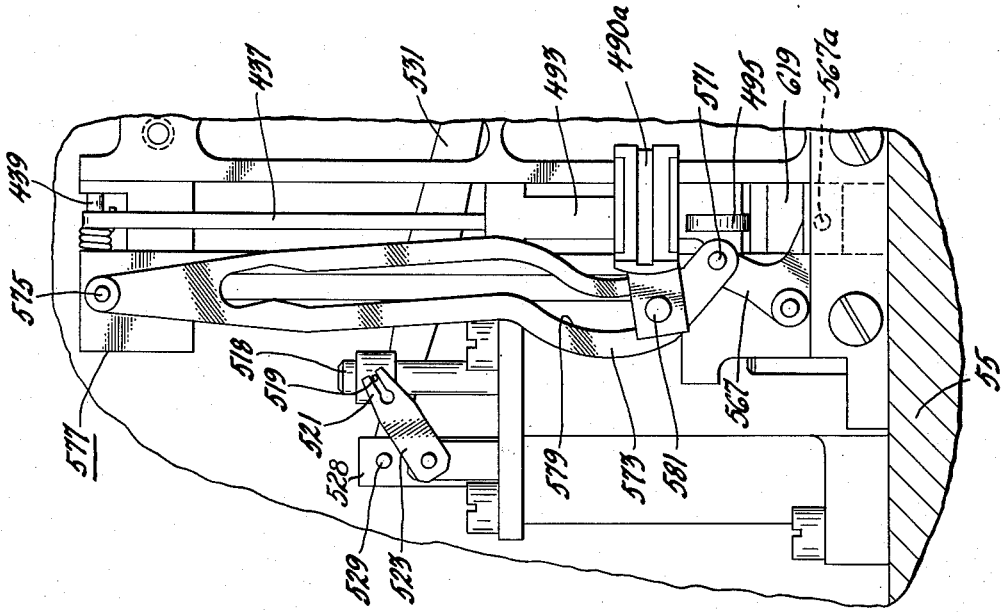
INVENTORS
Francis E. Conn
Calvin C. Covert
Elton K. Morice
William A. Weis
BY
O. C. Staley
THEIR ATTORNEY 3,003,566
VARIABLE PITCH PROPELLER
Francis E. Conn, Piqua, and Calvin C. Covert, Elton K. Morice, and William A. Weis, Dayton, Ohio, assignors to General Motors Corporation, Detroit, Mich., a corporation of Delaware
Filed Oct. 10, 1958, Ser. No. 766,611
20 Claims. (Cl. 170—160.21)

This invention relates to propellers, and particularly to variable pitch aircraft propellers.

Heretofore, variable pitch propellers designed for use with turbine engines have incorporated an isochronous governor for maintaining propeller and turbine speed substantially constant during flight, wherein the governor setting is not manually adjustable by the pilot during propeller operation. A propeller of this type is disclosed in copending application Serial No. 572,348 filed March 19, 1956, in the name of Bodem et al., and assigned to the assignee of this invention. However, with the development of variable speed turbines it is advantageous to incorporate pilot operated means for adjusting the speed setting of the governor to match the power output of the turbine throughout the forward thrust range. Moreover, in order to obtain maximum reversing thrust it is advantageous to incorporate a reverse governor whereby propeller speed is maintained substantially constant at full rated speed to absorb full turbine power during landing. The present invention relates to a variable pitch propeller including pilot controlled speed scheduling means operable in the forward thrust range; constant speed governing means operable in the reverse thrust range; hydraulic stop means for establishing minimum positive and minimum negative blade angles in the forward and reverse thrust ranges, respectively; and mechanically operated self-seeking feathering mechanism.

Accordingly, among our objects are the provision of a hydraulically controlled variable pitch propeller including governing means operable to maintain propeller speed substantially constant in the forward and reverse thrust ranges; the further provision of a forward and reverse thrust governor including means for adjusting the speed setting thereof during operation in the forward thrust range; the further provision of means for changing the operating characteristics of a speed sensitive governor system between forward and reverse thrust; the further provision of adjustable hydraulic low pitch stop means for establishing minimum blade angles during governing in the forward and reverse thrust ranges; and the still further provision of mechanically operable means for automatically moving the propeller blades of a hydraulically controlled variable pitch propeller to an optimum feather blade angle if the propeller rotates after the blades are moved into the feathering range.

The aforementioned and other objects are accomplished in the present invention by providing a self-contained hydraulically operated propeller with externally adjustable mechanical controls. Specifically, the propeller assembly includes a hub having a plurality of blades journalled therein for movement about their longitudinal axes between a maximum negative blade angle position and a fully feathered position. Each propeller blade is rotated by an independent torque unit disposed within the hollow shank portion thereof, which torque units may be of the type shown in U.S. Patent 2,734,587. The blade angle positions of the several propeller blades are coordinated by a master gear assembly rotatably journalled in the hub and drivingly connected with the blade gears of all the propeller blades.

The master gear assembly has a definite angular position with respect to the hub for each blade angle position of the propeller blades, and accordingly, releasable mechanical pitch lock means and releasable mechanical low pitch stop means are incorporated in the propeller hub and operatively associated with the master gear. The mechanical pitch lock and low pitch stop assemblies may be of the type disclosed in copending application Serial No. 571,523 filed March 14, 1956, in the name of Hirsch et al. and assigned to the assignee of this invention, now Patent No. 2,882,975.

The propeller hub is journalled for rotation about a stationary support shaft. The propeller hub is drivingly connected to the output shaft of the turbine through a hollow drive shaft coaxially disposed within the stationary support shaft and drivingly connected to the forward portion of the hub. In order to achieve full feathering, the master gear assembly is coupled to the stationary support shaft through a feather seeker clutch when the propeller blades are moved into the feathering range by hydraulic fluid under pressure. Accordingly, if the propeller should rotate after the blades have been hydraulically moved into the feathered range the blades will be mechanically moved to a fully feathered position wherein the propeller hub does not rotate relative to the stationary support shaft.

An air cooled reservoir for hydraulic fluid is attached to the forward portion of the propeller hub, and an electric motor driven feathering pump and a mechanically driven feathering pump are disposed within the reservoir. The mechanical feathering pump is driven continuously during propeller rotation, but the output thereof is normally by-passed back to the reservoir so that the mechanically driven feathering pump is normally unloaded. The electric motor driven feathering pump can be energized by the pilot at any time to feather the propeller blades.

The hydraulic control system for the propeller is contained within a regulator attached to and rotatable with the propeller hub. The hydraulic control system includes a plurality of propeller driven pumps for supplying fluid under pressure to control valves disposed within the regulator. The control valves within the regulator are grouped in five major assemblies, namely, a governor valve assembly, a feathering valve assembly, a pitch lock and pitch stop control valve assembly, a reverse governor selector and a solenoid valve assembly. Some of these valve assemblies are capable of external control through a plurality of nonrotatable axially movable control rings disposed within the regulator and supported by a stationary adapter assembly. In the instant propeller, three control rings are utilized, namely, a synchronizer control ring, a propeller control ring and a negative torque signal control ring.

The propeller control ring is controlled by the pilot through the propeller control lever whereby the pilot can select operation in reverse thrust governing, manually selected blade angles in the beta range, forward thrust governing and emergency feathering. The propeller control lever is movable between a full reverse position through a reverse governing range, through a blade angle selecting range, a forward thrust governing range to a full feathering position. In the forward thrust governing range, the pilot can manually adjust the speed setting of the governor between predetermined limits up to the full rated speed setting. When the propeller control lever is in the blade angle selecting range, the pilot can manually select any angle between a minimum positive blade angle of the forward thrust governing range and a minimum negative blade angle in the reverse thrust governing range. When reverse governing is selected the propeller control lever must be moved throughout the beta range so that the propeller blades will be moved to a minimum negative blade angle setting when the sense of the governor is reversed.

The synchronizing control lever for adjusting the position of the synchronizer control ring in the regulator may be actuated by an electromechanical synchronizer of the type shown in copending application Serial No. 630,234 filed December 21, 1956, in the name of Brockert et al. and assigned to the assignee of this invention. The negative torque signal control lever may be mechanically connected to any suitable negative torque sensing device in the gear box of the turbine so as to actuate the feathering valve in the regulator and thereby cause fluid under pressure to be supplied to the torque units to increase propeller pitch towards the feathered position.

Further objects and advantages of the present invention will be apparent from the following description, reference being had to the accompanying drawings, wherein a preferred embodiment of the present invention is clearly shown.

In the drawings:

FIGURES 1A, 1B and 1C constitute a schematic diagram showing the propeller and its control mechanism.

FIGURE 2 is a schematic diagram depicting operation of the governor in the reverse thrust range.

FIGURE 3 is a fragmentary view, partly in section and partly in elevation, of a propeller constructed according to the present invention.

FIGURES 3A and 3B are enlarged fragmentary views, partly in section and partly in elevation, taken along lines 3A—3A and 3B—3B of FIGURE 4.

FIGURE 4 is a fragmentary view, partly in section and partly in elevation, taken along lines 4—4 of FIGURES 3A and 3B.

FIGURE 5 is an enlarged view, partly in section and partly in elevation, taken along lines 5—5 of FIGURE 4.

FIGURE 6 is an enlarged fragmentary view, partly in section and partly in elevation, taken along lines 6—6 of FIGURE 4.

FIGURE 7 is a fragmentary view with certain parts broken away, taken along line 7—7 of FIGURE 5.

FIGURE 8 is a view similar to FIGURE 6 with its parts adjusted for operation in reverse governing; and FIGURE 9 is a fragmentary sectional view taken along line 9—9 of FIGURE 5.

Figure 1C:
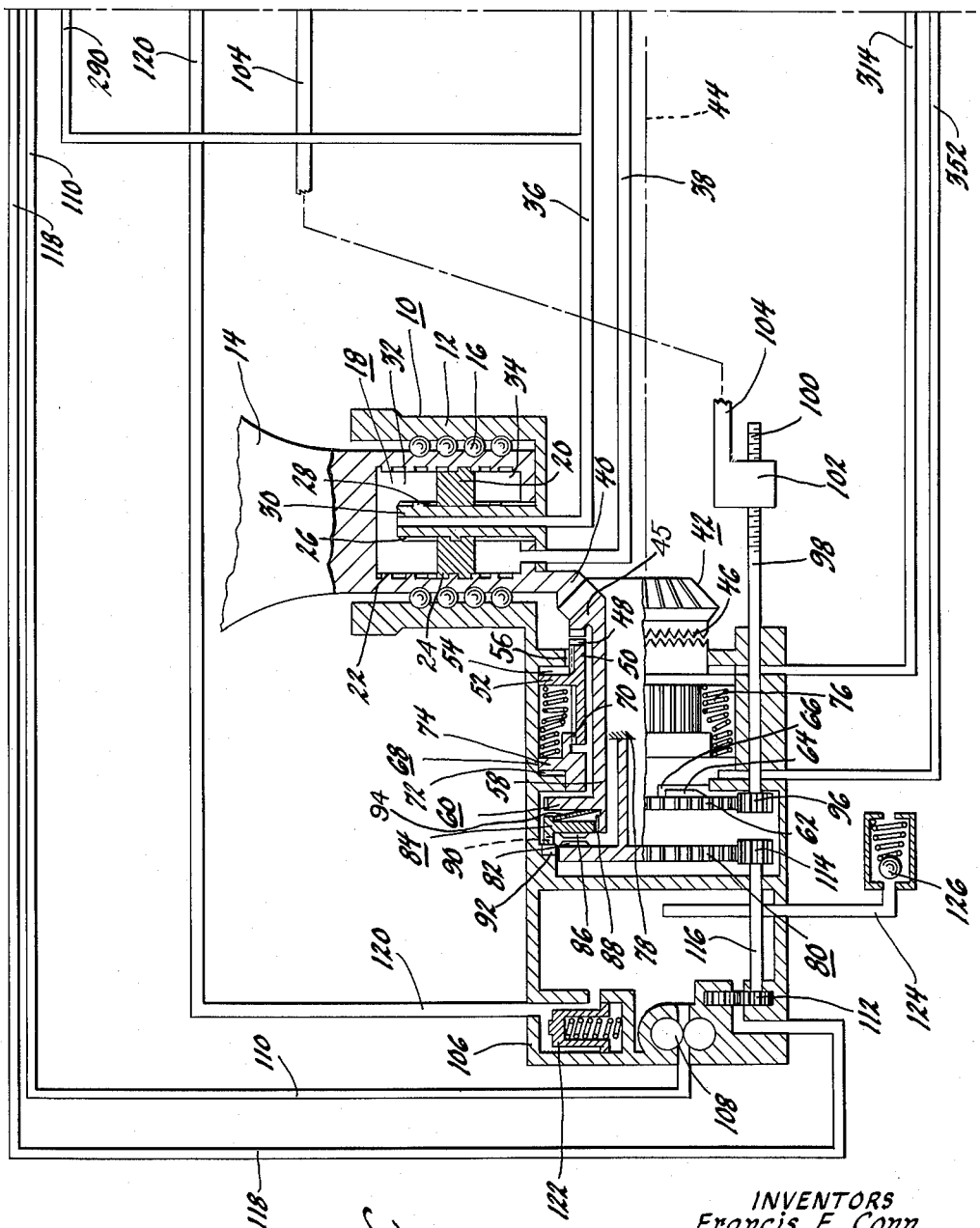

With particular reference to FIGURES 1A, 1B and 1C, wherein the propeller and the control system therefor are depicted schematically, the propeller includes a hub 10 having a plurality of radially extending sockets 12 within which propeller blades 14 are journalled by stack bearings 16 for rotation about their longitudinal axes between a maximum negative blade angle, for example, −33°, and fully feathered blade angle. Each propeller blade has a hollow shank portion within which fluid motor means for rotating the propeller blade about its longitudinal axis are disposed, these motor means comprising a cylinder 18 having a reciprocable piston 20 disposed therein. The inner wall of the cylinder 18 is helically splined as indicated by numeral 22 and the piston is formed with external helical spline teeth 24 which mate with the spline teeth 22. In addition, the piston 20 is formed with internal helical spline teeth 26 which mate with external helical spline teeth 28 formed on a fixed reaction member 30. Accordingly, reciprocation of the piston 20 will be accompanied by angular movement thereof, which angular movement is imparted to the propeller blade 14 so as to vary the pitch position thereof. The piston 20 divides the cylinder 18 into a decrease pitch chamber 32 and an increase pitch chamber 34, which communicate respectively with conduits 36 and 38. The maximum negative angle of the propeller blades is determined by engagement between the piston 20 and the lower end wall of the cylinder as depicted in FIGURE 1C, whereas the maximum positive angle is determined by engagement of the piston 20 with the top of the cylinder 18.

Each blade 14 is connected to a bevel gear sector 40, and the several sector blade gears mesh with a bevel-type master gear 42 which is journalled in the hub 10 for rotation about the horizontal propeller axis indicated by numeral 44 in FIGURE 1C. The master gear 42 has a definite angular position relative to the propeller hub 10 for each pitch position of the propeller blades throughout their range of adjustment. The master gear 42 has an integral axially extending skirt 45 having ratchet teeth 46 formed on the end surface thereof. The ratchet teeth 46 can be engaged by a complementary set of ratchet teeth 48 formed on an annulus 50, and when the ratchet teeth 48 engage the ratchet teeth 46 rotation of the master gear 42 is precluded in one direction, to prevent movement of the propeller blades 14 in the decrease pitch direction, while permitting rotation of the propeller blades about their longitudinal axes in the increase pitch direction. The annulus 50 and the skirt 45 of the master gear 42 constitute a mechanical pitch lock. The annulus 50 is formed with a piston surface 52 and is movable axially out of engagement with the master gear 42 upon the application of fluid under pressure to a servo chamber 54. The annulus 50 has a straight spline connection 56 with the hub 10 whereby rotation of the annulus relative to the hub is precluded whereas relative axial movement therebetween is permitted.

The master gear 42 is depicted schematically as being integral with a sleeve 58 which is shown schematically as being integral with an annulus 60 having a partially toothed periphery 62 and a plurality of circumferentially spaced axially extending jaws 64. The jaws 64 are engageable with jaws 66 formed on an annulus 68. The annulus 68 has a straight spline connection at 70 with the annulus 50 and hence is restrained against rotation relative to the hub 10 while free to move axially relative thereto. The jaws 64 and 66 constitute a mechanical low pitch stop, and the annulus 68 can be moved out of engagement with the annulus 60 by the application of fluid under pressure to a servo chamber 72. Pressure in the servo chamber 72 acts on a piston surface 74 formed as an integral part of the annulus 68. The axially movable pitch stop annulus 68 and the axially movable pitch lock annulus 50 are movable into engaging positions by common resilient means 76 in the form of a plurality of coil springs, opposite ends of which engage the back sides of piston surfaces 52 and 74, respectively. The springs 76 are operative to move the pitch lock annulus 50 into an engaging position in the absence of the application of pressure fluid to the servo chamber 54, and the springs 76 are likewise operative to move the pitch stop annulus 68 into an engaging position in the absence of fluid pressure in the servo chamber 72.

As will be pointed out more particularly hereinafter, the hub 10 is journalled for rotation about a fixed support shaft indicated schematically in FIGURE 1C by numeral 78. A ring gear 80 is rigidly connected to the fixed support shaft 78, the ring gear 80 being formed with a serrated end surface 82. An annular clutch member 84 is formed with a complementary serrated end surface 86, the clutch member 84 having a straight spline connection at 88 with the sleeve 58. In addition, the clutch member 84 has a plurality of circumferentially spaced axially extending lugs 90 which are engageable with a complementary set of circumferentially spaced lugs 92 formed on the hub 10. The clutch member 84 is urged toward the ring gear 80 by a Belleville spring 94 disposed between the clutch member 84 and the annulus 50. The coacting lugs 90 and 92 prevent axial movement of the clutch member 84 into engagement with the ring gear 80 at all times when the propeller blades are at an angle less than a predetermined high positive angle of for instance 80°. The feathering range of the propeller may be considered as being between a positive 80° and a fully feathered position. When the blades are moved to the feathering range, the lugs 90 and 92 are disengaged whereupon the Belleville spring 94 can move the clutch member 84 into engagement with the ring gear 80. Under these conditions, the clutch member 84, the sleeve 58 and hence the master gear 42 are restrained against rotation relative to the stationary support shaft 78. Consequently, rotation of the propeller hub 10 about the stationary support shaft in either direction will cause relative rotation between the master gear 42 and the blade gears 40 so as to mechanically drive the propeller blades to the fully feathered position, and when the propeller blades are in the fully feathered position the propeller will not windmill and hence no rotation will be imparted to the hub 10. Forward propeller rotation will result in increasing the pitch position of the blades whereas reverse propeller rotation will result in decreasing the pitch position of the blades.

The partially toothed periphery 62 of the annulus 60 constitutes an intermittent feed-back drive gear. Structurally, the intermittent feed-back assembly may be of the type shown in Hirsch Patent No. 2,761,519, and the partially toothed periphery 62 meshes with a pinion gear 96 attached to a rotary feed-back shaft 98. In the instant propeller, rotation is only imparted to the feed-back shaft 98 during movement of the propeller blades from a −15° to a +18°. At all other times, the pinion gear 96 and the shaft 98 are restrained against rotation relative to the hub 10. The feed-back shaft 98 is formed with a high lead screw portion 100 which engages a nut 102 shown schematically as being integral with a rod 104.

A feathering reservoir 106 is attached to the front of the hub 10, the feathering reservoir being maintained full of oil at all times. An electric motor operated feathering pump 108 is disposed within the reservoir 106, the delivery side of the pump 108 being connected to a conduit 110. In addition, a mechanically driven feathering pump 112 is disposed within the reservoir 106, this pump being driven by a pinion gear 114 through a shaft 116. The pinion gear 114 meshes with the ring gear 80, and hence whenever the hub 10 rotates relative to stationary support shaft 78, the pump 112 will be operated. The output side of the pump 112 is connected to a conduit 118. The reservoir 106 is air cooled as will be pointed out more particularly hereinafter, and is maintained full of oil since a certain amount of the drain oil from the regulator is directed to the reservoir 106 through a conduit 120. A predetermined minimum pressure is maintained within the reservoir 106, since the oil flowing through the drain conduit 120 must open a spring biased check valve 122 before it can flow into the reservoir 106. The check valve 122 may be set to open at a minimum pressure of 20 p.s.i. In order to circulate oil from the regulator to the reservoir and back to the regulator, a pick-up tube 124 having an inlet at the center of the reservoir 106 is provided. The tube 124 connects with the regulator reservoir through a spring biased check valve 126. Since the reservoir 106 rotates with the propeller 10, it will be appreciated that the oil in the reservoir will be thrown outwardly by centrifugal force and hence it is only when the reservoir 106 is full of oil that the overflow will return to the regulator through the tube 124.

With particular reference to FIGURES 1A and 1B, the components of the regulator assembly are schematically depicted. The fluid pressure system includes three pumps 128, 130 and 132 which are driven incident to propeller rotation. The pumps 128 and 130 draw fluid from the regulator reservoir and discharge it through check valves 134 and 136, respectively, to a conduit 138. The conduit 138 is connected to a conduit 140 constituting a high pressure supply conduit. The pump 132 is connected to an auxiliary pump control valve assembly 142 through a conduit 144. The auxiliary pump control valve assembly 142 includes a spring biased check valve 146, the outlet side of which is connected by conduit 148 to the conduit 138, an equal area type pressure control valve 150 and a flow control valve 152. The pressure control valve 150 includes a land 154 for controlling a drain port 156 which is connected to a conduit 158. When the pumps 128 and 130 can supply the flow and pressure requirements of the propeller control system, the pump 132 is unloaded and the output thereof is by-passed into the drain conduit 158. The flow control valve 152 includes a land 160, the upper surface of which is normally subjected to pressure fluid from a conduit 162. As long as the pressure of fluid supplied through conduit 162 acting on the upper surface of land 160 exceeds the force of spring 164 and the thrust of centrifugal force in the direction of arrow 166 acting on the valve element 152, the chamber at the lower side of the land 154 of the pressure control valve 150 will be connected to drain through passage 167 controlled by a second land 168 on the flow control valve 152. However, in the absence of fluid under pressure in conduit 162, the spring 164 and the thrust of centrifugal force will move the valve 152 upwardly so as to connect the passage 167 with a conduit 170. As will be pointed out more particularly hereinafter, the conduit 170 is subjected to the higher of the pressure differentials existent in the increase and decrease pitch chambers of the torque unit, and when this pressure acts on the lower surface of the land 154, the pump 132 will be loaded whereupon the output of the pump 132 will be connected through the check valve 146 and the conduit 148 through the conduit 138. Thus, when the pumps 128 and 130 cannot supply the flow requirements of the control system, the pump 132 will be connected into the system.

The high pressure supply conduit 140 connects with a branch conduit 172 as shown in FIGURE 1B, a spring biased check valve 174 and a passage 176 in a feathering valve assembly 178. The propeller control system also includes a solenoid valve assembly depicted generally by the numeral 180, a pitch lock and pitch stop control valve assembly 182, a governor valve assembly depicted by the numeral 184, and a reverse governor actuator depicted by the numeral 186. The feathering valve assembly 178 includes a servo actuated shuttle valve 188 having spaced lands 190, 192, 194, 196 and 198. The shuttle valve 188 is normally maintained in the position shown by a spring 200. Passage 176 connects with a port 202 of the shuttle valve bore, the shuttle valve bore also including ports 204, 206, 208, 210, 212, 214, 216 and 218. In the normal position of the shuttle valve 188, the ports 202 and 204 are interconnected, the ports 202 and 214 are interconnected, the ports 206 and 212 are interconnected, and the ports 216 and 218 are interconnected. Port 204 connects with a passage 220 having a spring biased check valve 222 therein which opens at a predetermined minimum pressure and connects passage 220 to conduit 223. The port 214 is connected by an internal passage to a port 224 of a solenoid operated valve 226. The valve 226 is maintained in the position shown in FIGURE 1B by a spring 228 when the solenoid 230 is deenergized. Upon energization of the solenoid 230, the valve 226 moves to the right so as to interconnect ports 224 and 232 whereupon fluid under pressure will be supplied from the conduit 140 through passage 176, ports 202 and 214 through ports 224 and 232 to the port 210 so as to move the shuttle valve downwardly. When the valve 226 is in the position shown in FIGURE 1B, the port 232 is connected to drain through a passage 234.

The feathering valve assembly 178 also includes a selector valve 236. When the selector valve 236 is in the position shown in FIGURE 1B, the passage 234 is connected to drain. However, upon downward movement of the selector valve 236 the passage 234 is connected to a passage 238, the passage 238 being connected to the pressure supply passage 176, whereupon port 210 of the shuttle valve will be connected to the pressure supply conduit 140 through passages 176 and 238, passage 234, and port 232 so as to move the shuttle valve 188 downwardly.

The feathering valve assembly 178 also includes a decrease loader valve 240 comprising a spring biased check valve which is operable to interconnect passages 242 and 246 when the pressure potential in passage 242 exceeds the pressure potential in passage 246 and the force of the spring 248. The passage 246 is connected through ports 206 and 212 when the shuttle valve 188 is in the position shown in FIGURE 1B to the decrease pitch conduit 36.

The delivery conduit 110 of the electric motor driven feathering pump 108 connects with a port 250 of a feathering pump control valve 252. The feathering pump control valve 252 includes a housing having a reciprocable sleeve 254 disposed therein, the sleeve 254 having sets of ports 256 and 258. The sleeve 254 is urged upwardly as viewed in FIGURE 1B by the thrust of centrifugal force in the direction of arrow 166, and upward movement of the sleeve 254 is opposed by a spring 260. A reciprocable plunger 262 is disposed within the sleeve 254 and urged upwardly by a spring 264, the spring 260 being stronger than the spring 264. The plunger 262 controls the connection of ports 258 with the drain conduit 120. The valve assembly 252 operates to control the output pressure of the electric motor driven feathering pump 108 such that if the feathering pump is energized during propeller rotation, the port 250 will be blocked by the sleeve 254 so that the full output pressure of the pump 108 will be delivered through check valve 174 to the high pressure supply conduit 140. However, as the speed of the propeller rotation decreases, the spring 260 will overcome the thrust of centrifugal force and move the sleeve 254 downwardly as viewed in FIGURE 1B whereupon the port 250 will be connected with port 256 so that the plunger 262 will be subjected to the output pressure of the feathering pump. If the output pressure of the feathering pump exceeds the opposing force of the spring 264, the plunger 262 will move downwardly and connect ports 258 to the drain conduit 120 and thereby relieve the system pressure. In the instant propeller, the valve assembly 252 will operate to relieve the system pressure when the propeller rotation is below 600 r.p.m. when the output pressure of the feathering pump exceeds 450 p.s.i. The maximum delivery pressure of the electric motor driven feathering pump may be on the order of 4500 p.s.i.

The solenoid valve assembly 180 includes a valve housing having a reciprocable plunger 266 therein which is normally centered by a pair of springs 268 and 270. The plunger 266 includes armatures 272 and 274 encircled by solenoid coils 276 and 278, respectively, such that upon energization of the solenoid coil 276 the plunger 266 will move to the right, and upon energization of the solenoid coil 278 the plunger 266 will move to the left. The solenoid valve housing includes a pressure supply port 280 and a pair of control ports 282 and 284. The port 284 is controlled by a land 288 and the port 282 is controlled by a land 289, the land 289 being appreciably wider than the land 288 such that the port 282 is never connected to the pressure supply port 280. The port 282 connects with a conduit 290, the conduit 290 being connected to the decrease pitch conduit 36. The port 284 connects with a conduit 292 through a pressure compensating valve assembly 294. The pressure compensating valve assembly 294 includes a one-way spring biased check valve 296 and a pressure reducing valve 298. When the port 280 is connected to the port 284, fluid under pressure is supplied to the conduit 292 through the check valve 296. The conduit 292 is connected with the increase pitch conduit 38 through ports 218 and 216 of the shuttle valve 188 when the shuttle valve is in the position depicted in FIGURE 1B. When port 284 is connected to the pressure supply 280, the port 282 is connected to drain. However, when the port 284 is connected to drain due to movement of the plunger 266 to the right, the port 282 remains blocked by the land 289. Under these conditions, the conduit 292 can only be connected to drain through the pressure reducing valve 298, and the pressure reducing valve 298 operates to maintain a constant pressure in chamber 300 so as to control the rate of drain flow from the increase pitch chambers and thus control the decrease pitch change rate of the propeller.

The pitch lock and pitch stop control valve assembly 182 includes a servo actuated pitch lock control valve 302, a servo actuated pitch stop control valve 304, a mechanically actuated valve 306 for controlling the servo valve 304, a speed sensitive valve 308 for controlling the servo valve 302 and a flow sensitive valve 310 for controlling the servo valve 302. Substantially constant low pressure oil is supplied to the pitch lock and pitch stop control valve assembly 182 through conduit 312. When the servo operated pitch lock control valve 302 is in the position shown in FIGURE 1B, reduced pressure is supplied through passage 314, passage 314 communicating with the servo release chamber 54 of the pitch lock. The reduced pressure also connects with a port 316 of the speed sensitive valve 308, the port 316 being connected at all times to a port 318 of the flow sensitive valve 310. When the flow sensitive valve 310 is in the position of FIGURE 1B, port 318 is connected with the port 320 so as to supply reduced pressure to port 322 of a sleeve 324 constituting a valve guide for the speed sensitive valve 308. When the speed of propeller rotation in the forward thrust governing range does not exceed the speed setting of the governor by more than five percent, the speed sensitive valve 308 will be in the position shown in FIGURE 1B wherein land 326 thereof interconnects ports 322 and 328 so as to supply pressure fluid to servo chamber 330 to maintain the valve 302 in the position shown in FIGURE 1B against the urge of spring 332. The sleeve 324 has imparted thereto slight reciprocating motion through a bellcrank 334 to reduce static friction. The speed sensitive plunger 308 tends to move upwardly in response to centrifugal force in the direction of arrow 166, which upward movement is opposed by a spring 336. The opposing force of spring 336 is controlled by the position of bellcrank 338, one end of which is connected to a seat for the spring 336 and the other end of which is connected to an adjustable rod assembly 340.

The flow sensitive valve 310 includes a land 342 which is subjected to pressure from a conduit 158. Accordingly, when the pump 132 is not connected into the system, the flow sensitive valve element 310 will be maintained in the position shown in FIGURE 1B against the opposing force of a spring 344. In the absence of drain flow in the conduit 158, indicating a loss of fluid pressure in the propeller control system, the spring 344 will move the valve 310 upwardly thereby connecting port 320 to drain whereupon the spring 332 will move the pitch lock control valve 302 upwardly and connect passage 314 to drain enabling the spring 76 to move the pitch lock annulus 50 into engagement with the master gear 42.

The mechanical pitch stop annulus 74 is normally maintained in a position where it can engage the lugs on the annulus 60 when the propeller is operated in the forward thrust governing range and the propeller blades are moved to predetermined low pitch angle, for instance a positive 15°. In order to remove the mechanical low pitch stop to permit movement of the blade into the negative blade angle range, the valve 306 is moved upwardly whereupon the upper surface of the servo valve 304 is subjected to pressure fluid from the conduit 312 through ports 346 and 348. When the valve element 304 is moved downwardly against the urge of spring 350, reduced pressure will be supplied from conduits 312 to conduit 352 which communicates with the low pitch stop release servo chamber 72. Movement of the valve element 306 upwardly also connects conduit 354 to pressure.

Referring again to FIGURE 1A, the conduit 113, connected to the outlet side of the mechanically operated feathering pump 112, is connected with a spring biased check valve 356, such that under some conditions the output of the pump 112 can be connected to the high pressure conduit 140. Normally, however, the pump 112 is unloaded by unloading valve 358 having an inlet port 360 connected to the conduit 118. The unloading valve 358 includes a plunger 362 which is mechanically actuated and in the position shown in FIGURE 1A, the output of the pump 112 is by-passed to conduit 364 which is connected with the drain conduit 120 as seen in FIGURE 1B.

The high pressure conduit 140, as aforedescribed, is normally connected with the conduit 223 as seen in FIGURE 1B. Conduit 223 connects with a passage 366 in the governor valve assembly 184. The passage 366 connects with the supply ports 368 of a servo actuated distributor valve 370, a pressure relief valve 372 and an equal area pressure control valve 374. The equal area pressure control valve 374 is biased upwardly by a spring 376 and includes a throttling land 378 having opposed equal areas, the upper of which is subjected to the pressure potential in passage 366, and the lower of which is subjected to the pressure potential in passage 380. Passage 380 connects with a shuttle valve 382, opposite ends of which connect with passages 384 and 386. Passage 386 connects with the decrease pitch conduit 36 through conduit 290, and passage 384 connects with the increase pitch conduit 38 through conduit 384. Accordingly, the passage 380 and the lower surface of the land 378 will be subjected to the higher of the pressure potentials existent in the opposed chambers of the torque units so that the output pressure of pumps 128 and 130 will be regulated in accordance with the demands of the torque units. The spring 376 and the thrust of centrifugal force acting on the equal area valve 374 will always maintain the pressure potential in passage 366 at approximately 450 p.s.i. above the higher of the pressure potentials in the torque units. Excess flow produced by the pumps 128 and 130 is diverted into the conduit 162. The relief valve 372 limits the maximum pressure of the pumps 128 and 130.

The conduit 140 is connected to the branch conduit 172, and the branch conduit 172 connects with a pressure reducer valve 388, of conventional design and construction, which operates to maintain a substantially constant low pressure of substantially 450 p.s.i. in conduit 312. Conduit 312 is connected to ports 390 of the servo distributor valve 370 and to a supply port 392 and a speed sensitive valve assembly 394. The speed sensitive valve assembly includes a centrifugal responsive plunger 396 having a control land 398, and a follow-up sleeve 400 having control ports 402. The control ports 402 connect with a passage 404, the passage 404 communicating with a servo chamber 406 of the distributor valve 370.

The plunger 396 is connected at 408 to a centrifugally responsive lever 410. The plunger 396 and the lever 410 constitute a centrifugal mass, the center of gravity of which is indicated by numeral 412. Spring pressure is applied to the lever 410 at a point spaced to the left of the center of gravity 412 through a rod 414, the upper end of which constitutes a seat for a compression spring 416. The other end of the spring 416 engages an adjustable spring seat 418. In the position shown in FIGURE 1A, the lever 410 and the plunger 396 are urged in a clockwise direction about a roller type fulcrum 420 due to the thrust of centrifugal force in the direction of arrow 166, while the spring 416 opposes movement of the centrifugally responsive mass, under the thrust of centrifugal force. The fulcrum 420 is disposed within an elongated slot 422 of the lever 410, and can be moved to the lefthand side of the center of gravity denoted by numeral 412 to reverse the sense of the centrifugally responsive mass as will be pointed out more particularly hereinafter.

The spring seat 418 threadedly receives a rod 424, the upper end of which is pivotally connected to an end of a bellcrank 426. The intermediate pivot point of the bellcrank is carried by one end of a second bellcrank 428. The other end of the bellcrank 426 is pivotally connected to a plunger 430. In the position shown in FIGURE 1A, the plunger 430 abuts a threaded rod 432 having a cam follower 434 which engages a cam surface 436. The rod 432 threadedly engages a sleeve 438, and upon movement of the rod 432 due to the coaction between follower 434 and cam 436 the position of plunger 430 will be adjusted so as to vary the load on the spring 416, and hence the speed setting of the speed sensitive governor.

The rod 432 can be adjusted relative to the sleeve 438 before assembly of the propellers to adjust the speed setting of the governor in the reverse thrust range. The rod 424 can be adjusted relative to the spring seat 418 prior to assembly of the propeller to adjust the maximum speed setting of the governor in the forward thrust governing range. The speed setting of the governor in the forward thrust range can also be varied by the pilot through movement of a cam 440 having a follower 442 with which a rod 444 has threaded engagement. The rod 444 is pivotally connected to the other end of the bellcrank 428. The intermediate pivot point of the bellcrank 428 is carried by an adjustable screw 446 which is utilized to vary the speed range of the governor in the positive thrust governing range. When the rod 444 is moved upwardly, as viewed in FIGURE 1A, the lefthand end of the bellcrank 428 is moved downwardly, and since the right hand end of the bellcrank 426 is pivoted to plunger 430, the rod 424 is moved downwardly by the bellcrank 426 to increase the force on the spring 416. The speed setting of the governor in the forward thrust governing range can also be varied by movement of the cam 436 wherein upward movement of the rod 432 will pivot the bellcrank 426 to increase the load on the spring 416.

The servo actuated distributor valve includes a fixed plunger insert 448 and a movable sleeve 450. The lower closed end of the sleeve 450 denoted by numeral 452 constitutes a piston surface subjected to the pressure fluid in servo chamber 406. The upper annular surface 454 is subjected at all times to the constant reduced pressure in conduit 312. Since the area 452 is substantially greater than the area 454, the position of the sleeve 450 can be controlled by connecting the chamber 406 to pressure or drain. The valve guide for the servo distributor valve sleeve 450 is formed with drain ports 456 and 458, as well as control ports 460 and 462. When the servo chamber 406 is connected to drain, as caused by upward movement of the speed sensitive plunger 396, the sleeve 450 will move downwardly due to pressure acting on the annular surface 454, thereby connecting port 460 to drain port 456, and connecting port 462 to the pressure supply port 368. Under these conditions, high pressure fluid from conduit 366 will be supplied to the conduit 292 which is connected to the increase pitch conduit 38 while the decrease pitch conduit 36 is connected to the conduit 290 which is connected to drain. Downward movement of the sleeve 450 will pivot bellcrank 464 which is connected to the sleeve 400 so as to effect a follow-up upward movement of the sleeve 400. The sleeve 400 is normally biased upwardly by a spring 466 so that if the fluid pressure system should fail, the sleeve 450 will be moved downwardly. The arrangement of the follow-up sleeve 40 with respect to the plunger 396 results in movement of the distributor valve sleeve 450 in proportion to the amount of speed error.

A hydraulic jitter plunger 468 is connected to conduit 470, the conduit 470 communicating through ports 402 with the passage 404 and servo chamber 406. The jitter plunger 468 pulsates the oil in the chamber 406 so as to reduce static friction. When the speed sensitive plunger 396 moves downwardly, the servo chamber 406 is connected to the low pressure port 392 so as to effect upward movement of the sleeve 450. When the distributor valve sleeve 450 moves upwardly throughout a predetermined distance the decrease pitch port 460 is connected to the pressure supply passage 366 and the increase pitch port 462 is connected to drain. The bellcrank 464 will impart a follow-up movement to the sleeve 400 in a manner similar to that aforedescribed.

The propeller includes three nonrotatable, axially movable control rings 472, 474 and 476. The control ring 472 is engaged by a shoe 478 which rotates with the propeller, the shoe 478 being shown schematically connected by a rod 480 to the cam 436. The control ring 472 is moved axially by rotation of a plurality of high lead screws, only one of which is shown in FIGURE 1A designated by numeral 482. The high lead screws 482 carry pinion gears 484 which engage an internal ring gear 486 to which a synchronizer control lever 488 is attached. The synchronizer control lever can be rotated by an actuator, not shown, rotation of the ring gear 486 imparting axial movement to the control ring 472 so as to adjust the axial position of the rod 480 and the cam 436 thereby varying the load on the spring 416 to change the speed setting of the governor.

The control ring 474 is depicted schematically as having two follower shoes 490 and 492. The control shoe 490 is connected to a rod 491 which carries cams 494 and 440. The cam 440 has a slot 496 with a dwell 498, an inclined portion 500 and a second dwell 502. When the cam follower attached to the sleeve 442 is disposed in the inclined portion 500, movement of the cam 440 to the left or the right will vary the load on the spring 416 to vary the speed setting of the governor in the forward thrust range. The speed setting of the governor will be substantially 570 r.p.m. when the follower is in the dwell 498, and 1040 r.p.m. when the follower is in the dwell 502.

The cam 494 has a slot 504 engaged by a follower attached to the rod 506. The rod 506 is connected with the valve plunger 362, such that when the cam 494 is moved to the right, the plunger 362 will be moved upwardly thereby interrupting the connection between the port 360 and the conduit 364.

The control shoe 492 is shown connected to a rod 508, having a cam follower 510 in FIGURE 1A and cam followers 512 and 514 in FIGURE 1B. In addition, the rod 508 has cam plate 511 attached thereto. The cam follower 510 is disposed within a cam slot 513 of a lever 515 having a pivot point at 516. The lever 515 is part of the reverse governor actuator assembly 186 which includes a selector valve 518, a servo valve 520 and a servo piston 522. The servo piston 522 is disposed within a cylinder 524, normally urged to the position shown by a spring 526 and low pressure fluid from conduit 312. The piston 522 is connected to a rod 528 having a collar 530 cooperable with a latch 532. When the latch 532 is in the position shown in FIGURE 1A, the piston 522 cannot move to the left under the urge of fluid pressure in cylinder 524 on the right side of piston 522.

Upon movement of the rod 508 and the follower 510 to the left, as viewed in FIGURE 1A, the follower 510 will engage the inclined portion of the slot 513 so as to move the lever 515 in the counterclockwise direction about pivot 516. This will cause downward movement of the latch rod 532 as well as downward movement of the selector valve 518. The selector valve includes a pressure supply port 534 connected to the conduit 354, such that when the selector valve 518 is moved downwardly, pressure is supplied from the conduit 354 to a passage 536 beneath the servo valve 520. Therefore, the servo valve 520, which is normally urged to the position shown by a spring 538, will move upwardly connecting passage 540 to drain passage 542, and passage 544 to passage 546, the passage 546 communicating with the conduit 312. Accordingly, pressure fluid will be supplied to cylinder 524 to effect movement of the piston 522 to the left as viewed in FIGURE 1A.

When the piston 522 moves to the left, fulcrum roller 420 will be moved from the position of FIGURE 1A to the position of FIGURE 2 wherein the force of the governor spring acts between the center of gravity and the fulcrum thereby reversing the sense of the governor, as will be described in detail hereinafter. The rod 528 also carries cam followers 548 and 550 which are associated respectively with cam slots 552 and 554 in levers 556 and 558. The levers 556 and 558 are pivotally interconnected by a pin 560 which is carried by a rod 562. The rod 562 is pivotally connected at 564 to a bellcrank 566, as shown in FIGURE 1B.

The lever 556 carries a roller 568 which is engageable with a cam surface 570 of the lever 410. The lever 558 carries a roller 572 which is engageable with a cam surface 574 of the lever 410. When the piston 522 is moved from a position of FIGURE 1A to the position of FIGURE 2, it can be seen that the lever 558 is shifted in a counterclockwise direction as is the lever 556 so that while the roller 572 is engageable with the cam surface 574 in FIGURE 1A, the roller 568 is engageable with the cam surface 570 in FIGURE 2. When the selector valve 518 is moved upwardly due to clockwise movement of the lever 515, passage 536 is connected to drain thereby enabling the spring 538 and low pressure fluid to move the servo valve 520 in the position of FIGURE 1A before the latch rod 532 is moved upwardly a sufficient distance to interfere with the collar 530. Thus, pressure fluid is supplied to the left-hand side of the cylinder 524 through the passage 540 while the right-hand end of the cylinder 524 is connected to drain through passages 544 and 576 thereby enabling return movement of the piston 522 after which the rod 532 is moved upwardly so as to prevent movement of the piston 522 to the left, as viewed in FIGURE 1A.

The control ring 474 is moved axially by rotation of a plurality of high lead screws, one of which is indicated by numeral 578, having pinion gears 580 engaging ring gear 582. Ring gear 582 is connected to a propeller control lever 584 which is under the control of the pilot.

The follower 512 on the rod 508 actuates a lever 586 having a cam slot 588, lever 586 being pivoted at 590. The valve element 396 is pivotally connected to the lever 586, such that upon movement of the rod 508 and the follower 512 to the left, the lever 586 will be shifted in the counterclockwise direction so as to move the plunger 306 upwardly. As aforedescribed, the plunger 306 controls the supply of low pressure fluid to the servo actuated pitch stop valve 304 and likewise controls the supply of pressure fluid to the conduit 354. Conduit 354 connects with the reverse actuator assembly 186 and servo chamber 594 associated with the plunger 430. Accordingly, when the plunger 306 is moved upwardly, the plunger 430 moves upwardly within the sleeve 438 to reset the governor spring 416 for the full rated speed setting in the reverse thrust range.

The cam 511 has a slot 596 with an inclined portion 598, a dwell 600, an inclined portion 602, a dwell 604, an inclined portion 606 and a dwell 608. A cam follower 610, attached to plunger 612, and a cam follower 614 carried by a pivoted lever 616 are disposed within the cam slot 596. The lever 616 is pivotally connected at 618 to one end of the bellcrank 566, the other end of which is pivotally connected to the rod 104. When the rod 508 is moved to the right as viewed in FIGURE 1B so that the follower 614 is moved downwardly into the portion 598 of the slot, the lever 616 is moved in a clockwise direction about its pivot 620 thereby pivoting the bellcrank 566 about its pivotal connection with the rod 104 in the counterclockwise direction. This will move the rod 562 to the right as viewed in FIGURE 1A thereby moving the levers 556 and 558 to the right so as roller 572 will engage the cam surface 574 to move the plunger 396 upwardly thereby calling for an increase in propeller pitch towards the feathered position.

During movement of the cam 511 when the follower 614 is in the dwell 600, no movement will be imparted to the lever 616 or the bellcrank 566. When the follower 614 is in the inclined portion 602, movement will be imparted to the bellcrank 566 so as to move the rod 562 to the left during counterclockwise pivotal movement of the lever 616; and to the right during clockwise pivotal movement of the lever 616. When the follower 614 is in the inclined portion 602 the propeller is operated in beta wherein the pilot can manually select the blade angle between a negative 15° and a positive 18°, and when the angle selected by the pilot is reached by the propeller blades, the feed-back rod 104 will reposition the rod 562 through the bellcrank 566.

When the follower 614 is in the dwell 604, the pitch position of the propeller blades cannot be moved in the increase pitch direction above a negative 15° due to co-action between the follower roller 568 and the cam surface 570 on the lever 410. This constitutes the hydraulic low pitch stop establishing the minimum negative blade angle during reverse governing. When the follower 614 is in the dwell 600, the minimum positive low pitch stop position of the blades in the forward governing range is established by the roller 572 and the cam surface 574 of the lever 410. The minimum hydraulic low pitch stop in the forward thrust governing range may be on the order of a positive 18°, whereas the mechanical low pitch stop is slightly below this angle, for instance at a positive 15°.

The follower 610 and the plunger 612 are utilized to adjust the speed setting of the pitch lock control valve 308 so as to maintain the speed setting of the pitch lock control valve substantially five percent greater than the speed setting of the governor valve 394. Thus, when the follower 610 is in the inclined portion 606, the follower attached to the sleeve 442 is in the inclined portion 500 of the cam 440 whereby the speed adjustment of the governor spring 416 due to movement of the control ring 474 is accompanied by a like speed adjustment of the spring 336 associated with the pitch lock control valve. Similarly, when the speed setting of the governor spring 416 is a maximum such as when the follower is in the dwell 502, the speed setting of the governor spring 336 will be a maximum and the follower 610 will be in the dwell 604. Conversely, when the speed setting of the spring 416 is a minimum wherein the follower associated with the plunger 442 is in the dwell 498, the follower 610 is in the dwell 608.

The follower 514 attached to the rod 508 is disposed within a cam slot 621 of the lever 622. The lever 622 is pivotally connected at 624 to the selector valve 236. The lever 622 has a second cam slot 626 having a follower 628 therein carried by a rod 630. Assuming the rod 630 to be stationary, the lever 622 will pivot about the cam follower 628 during movement of the rod 508. When the rod 508 is moved to the right, the lever 622 will pivot in a clockwise direction about the follower 628 to move the selector valve 236 downwardly to interconnect passages 238 and 234. When the rod 508 is moved so that the follower 514 is disposed in the end portion 632 of the slot 621, the selector valve 236 will be moved upwardly such that movement of the rod 630 to the left will not impart sufficient movement to the lever 622 and the selector valve 236 to interconnect passages 234 and 238. Thus, the portion 632 of the slot 621 precludes actuation of the shuttle valve 188 when the propeller blades are operated in either the beta range or reverse thrust governing.

The rod 630 is connected to a shoe 634 which follows the control ring 476. The control ring 476 is moved by rotation of high lead screws 636 having pinion gears 638 engaging ring gear 640. Ring gear 640 is connected to a lever 642. The lever 642 may be actuated by any suitable negative torque sensing mechanism for moving the control ring 476 to the left when the propeller is operated in the forward thrust governing range.

The propeller control lever 584 is depicted in FIGURE 1A as being in the forward thrust governing range, such that movement of the ring gear 582 in the clockwise direction will increase the speed setting of the governor to the full rated speed setting and further movement of the ring gear 582 in the clockwise direction will call for emergency propeller feathering. Movement of the control ring 582 in the counterclockwise direction will reduce the speed setting of the governor to the minimum speed setting of 570 r.p.m. until the flight idle position is reached, after which continued counterclockwise rotation of the ring gear 582 will actuate the pitch stop control valve to remove the mechanical low pitch stop so as to enable the pilot to select any angle within the beta range between a negative 15° and a positive 18° if the speed of propeller rotation is below the speed setting of the governor. Continued movement of the ring gear 582 in the counterclockwise direction will operate the reverse governor thereby reversing the sense of the governor and esetablishing the minimum negative angle of the propeller blades in the reverse thrust range. At this time, if the propeller blades are in the positive thrust range, they will immediately be shifted to the negative thrust range due to coaction between the roller 568 and the cam surface 570 on the lever 410. Any further movement of the ring gear 582 in the counterclockwise direction will have no effect on either the speed setting of the governor or the minimum scheduled negative blade angle and the propeller will operate at the full rated governor speed in the reverse thrust range.

Figure 3A:
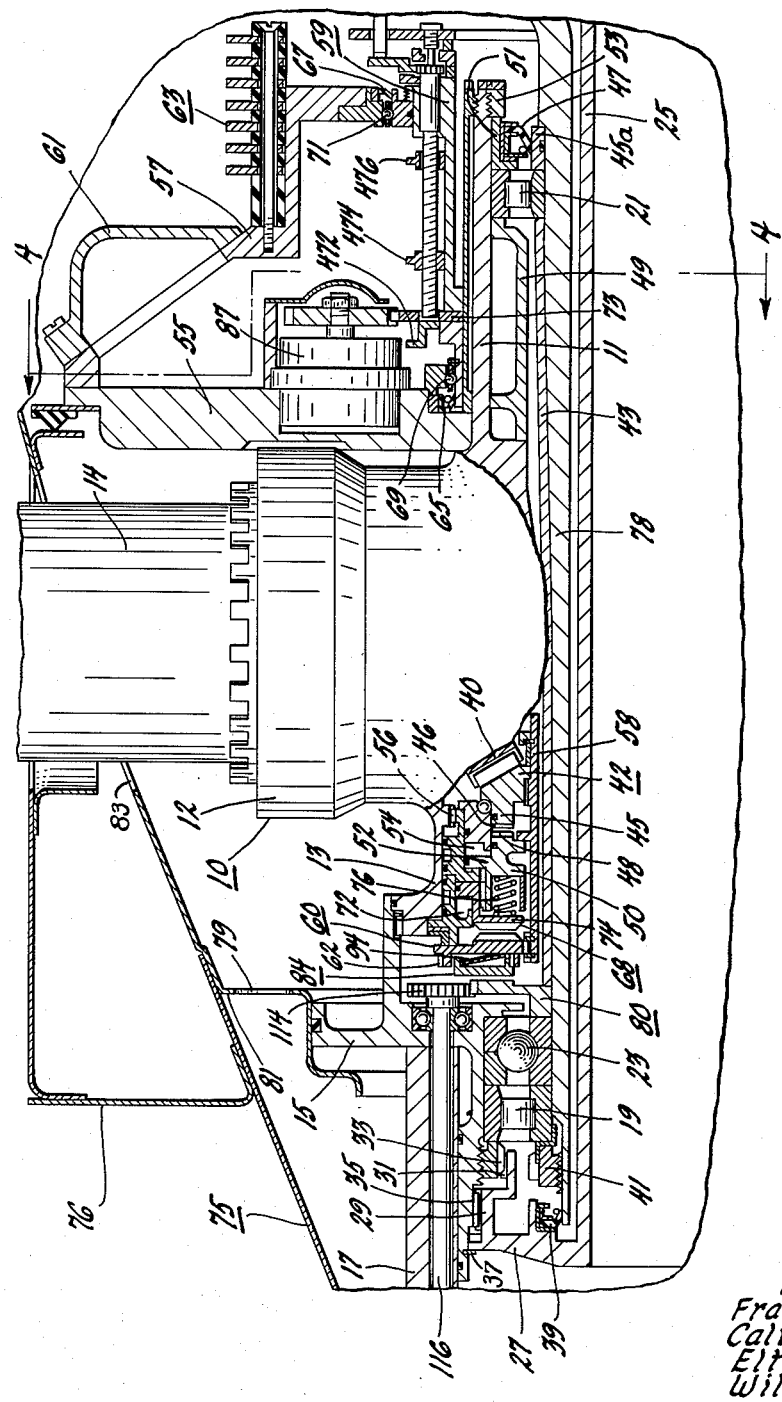

With particular reference to FIGURES 3, 3A and 3B, the structural embodiment of the propeller will be described. The propeller hub 10 is formed with four radially extending sockets 12 spaced 90° apart. The hub 10 is formed with a rearwardly extending portion 11 and a forwardly extending portion 13. A flanged annulus 15 is rigidly attached to the hub portion 13, and an annulus 17 is rigidly secured to the flanged annulus 15. The feather reservoir housing 106 is rigidly attached to the annulus 17 such that the reservoir housing 106, the annulus 17 and the annulus 15 rotate with the hub 10. The pump 108 is shown having a geared driving connection with an electric motor 109.

The hub 10 is supported for rotation about the fixed support shaft 78 by spaced radial bearings 19 and 21 and a thrust bearing 23. A hollow drive shaft 25 is coaxially disposed within the stationary support shaft 78, the drive shaft 25 extending beyond the end of the support shaft 78 and having a radially extending flange portion 27. The flange portion 27 is formed with a pair of spaced sets of straight spline teeth 29 and 31. The spline teeth 31 are engaged by a ring nut 33 which threadedly engages the annulus 15 and retains the inner races of bearings 19 and 23 in fixed relation relative to the annulus 15 and the hub 10. The straight spline teeth 29 mesh with a set of straight spline teeth 35 formed on the annulus 15, and the spline teeth 29 and 35 constitute the driving connection between the shaft 25 and the hub 10. The annulus 15 and the drive shaft 25 are maintained in fixed relative axial positions by a snap ring 37.

A sealing ring 39 carried by the flanged end 27 of the drive shaft 25 resiliently engages the support shaft 78 so as to prevent the loss of lubricant from the bearings 19 and 23. The inner race of the bearings 19 and 23 are held in fixed relationship to the support shaft 78 by a ring nut 41 which threadedly engages the support shaft 78. The inner race of bearing 21 is maintained in fixed relationship to the stationary support shaft 78 by a pair of sleeves 43 and 45a. The rearwardly extending portion 11 of the hub 10 supports a resilient sealing ring 47 which engages the ring 45 so as to prevent the loss of lubricant from the bearing 21. The outer race of the bearing 21 is retained in fixed relation to the portion 11 of the hub by a pair of sleeves 49 and 51, the sleeve 51 being engaged by a ring nut 53 which threadedly engages the portion 11 of the hub.

A regulator reservoir is attached to the rear of the propeller hub and rotates therewith, the regulator reservoir including a front plate 55, a cover 57 and a stationary adapter assembly 59. The regulator cover 57 has a plurality of removable access plates 61 suitably attached thereto and also carries a slip ring assembly 63. Suitable sealing rings 65 and 67 are disposed between the rotating regulator parts and the stationary adapter assembly 59, and the front plate 55 and the cover 57 are journalled for rotation about the stationary adapter assembly 59 by ball bearings 69 and 71, respectively. The regulator reservoir contains a quantity of oil which forms a torus during rotation of the propeller. The non-rotatable control rings 472, 474 and 476 are supported on the stationary adapter 59 for axial movement relative to the regulator assembly. In addition, a stationary pump power gear 73 is carried by the stationary adapter assembly 59 for actuating the pumps 128, 130, and 132 during rotation of the propeller relative to the stationary adapter assembly 59.

The hub 10, the feathering reservoir 106 and the regulator reservoir are enclosed by a spinner shell 75 having a centrally disposed air inlet opening 77 in the nose portion thereof. Air entering the opening 77 flows across the outer periphery of the feathering reservoir 106 so as to cool the oil therein. This cooling air flows through openings 79 in a spinner support bulkhead 81 which engages the flanged annulus 15 and escapes to atmosphere through the cutout openings 83 in the spinner shell 75 through which the blades 14 project. The spinner shell 75 is suitably attached to the front plate 55 of the regulator by fastening means 77 of any suitable type. In addition, the spinner shell 75 is formed with islands 76 which partially surround the cutout openings 83. The islands 76 are of airfoil shape as seen in FIGURE 3 and form a continuation of the airfoil portion of the propeller blade when the blades are in a predetermined blade angle position.

With particular reference to FIGURE 4, the valve assemblies and pumps of the propeller control system are mounted on the front plate 55 of the regulator. The pumps 128, 130 and 132 are utilized to pump fluid from the reservoir and supply this fluid under pressure to the high pressure conduit 140 of the fluid pressure system, as hereinbefore described. A fourth regulator pump denoted by numeral 87 also has its drive gear meshing with the pump power gear 73 and is utilized to supply lubricating fluid to the bearings 19, 21 and 23. The governor valve assembly 184 is mounted on the front plate 55 of the regulator so that the centrifugally responsive elements thereof are located substantially radially with respect to the horizontal propeller axis. The hydromechanical feathering pump control valve 358 is embodied in the governor assembly 184. The reverse governing actuator 186 is attached to the front plate 55 adjacent the governor valve assembly 184. The solenoid valve assembly 180 is mounted so that the longitudinal axis of the plunger is at right angles to a radial line intersecting the axis of propeller rotation so as to eliminate the effects of centrifugal force on movement of the solenoid valve plunger. The feathering control valve assembly 178 is radially mounted within the regulator as is the pitch lock and pitch stop control valve assembly 182. The jitter valve 468, the check valve 174, the feathering pump control valve 252 and the auxiliary pump control valve assembly 142 are likewise attached to the regulator front plate 55.

With particular reference to FIGURES 5 through 9, the structural embodiment of the control mechanism for the governor valve assembly and the reverse governor actuator will be described. The centrifugally responsive lever 410 is formed with an elongated longitudinal slot 422 having a medial portion of greater width than the end portions. The fulcrum 420 structurally comprises a pair of rollers 421 and 423 which are disposed within the slot 422 and are supported by a slidable carriage 425a having a bifurcated end 427 which engages a pin 429. The pin 429 constitutes a part of a carriage 425, slidably supported in a rail assembly 577, and having an elongated slot 433 therein constituting the equivalent of the slots 552 and 554 in the levers 556 and 558 shown schematically in FIGURE 1A. The levers 556 and 558 are pivotally interconnected by the pin 560 which constitutes a part of a carriage 561.

Carriage 561 constitutes the structural equivalent of the rod 562 as shown in FIGURE 1A and is connected by means of a pin 564 to the intermediate portion of bellcrank 566.

As seen in FIGURE 5, one end of the bellcrank 566 is pivotally connected by means of a pin 567a to a carriage 569 which constitutes the structural equivalent of the nut 102 as seen in FIGURE 1C. The other end of the bellcrank 566 is pivotally connected by a pin 618 to a carriage 619 which constitutes the structural equivalent of the pivoted lever 616 as seen in FIGURE 1B. The carriage 619 is also pivotally connected to one end of a bellcrank 567 having an intermediate pivot 568 as seen in FIGURE 6. The other end of the bellcrank 567 is pivotally connected at 571 to a lever 573. The lever 573 is pivoted at 575 to the rail assembly 577 for the several carriages. The lever 573 has an elongated cam slot 579 engaged by a follower 581 attached to a control shoe 490a which constitutes the structural equivalent of the control shoes 490 and 492 shown in FIGURE 1A. The control shoe 490a is shown in the reverse governing position in FIGURE 8 and in the forward thrust governing position in FIGURE 6. The control shoe 490a is attached to a carriage 493 slidable in the rail assembly 577, and when the shoe 490a and its follower 581 are moved so that the follower 581 is in the extreme left-hand end of the slot 579, the propeller will be conditioned for emergency feathering operation.

As seen in FIGURE 9, the carriage 493 includes a roller 495 for positioning a lever 437 constituting the structural equivalent of the cam plate 440 in FIGURE 1A. Accordingly, during movement of the carriage 493 upwardly as seen in FIGURE 9, the lever 437 will pivot about its fulcrum 439 so as to vary the load on the governor spring 416 and thus vary the speed setting of the governor. The lever 573 and hence the bellcrank 567 are only actuated when the cam follower 581 moves into the curved portions of the slot 579, and when feathering operation is selected or a particular blade angle is selected in the beta range, or during a transition from forward thrust governing to reverse thrust governing and vice versa.

A lever 581a is supported by pivot pin 581b, lever 581a having a bifurcated end 583 which receives a pin 585 attached to the valve plunger 518 of the reverse governor actuator 186. The plunger 518 has a pin 519 disposed in the bifurcated end 521 of a lever 523. The lever 523 controls the mechanical latch depicted schematically by rod 532 in FIGURE 1A associated with the rod 528 of the actuator piston 522. Structurally, the rod 528 is pivotally connected by means of a pin 529 to one end of a bellcrank 531 having a fixed intermediate pivot point 533 carried by the housing of the reverse governor actuator valve assembly 186. The other end of the bellcrank 531 is pivotally connected by pin 535 to the carriage 431. The bellcrank 531 is shown in the forward thrust governing position in FIGURES 5 and 6 and in the reverse thrust governing position in FIGURE 8. In the forward thrust governing position, the roller 423 constitutes the fulcrum for the centrifugal responsive lever 410 which is located to the right of the center of gravity of the centrifugally responsive lever and plunger assembly, whereas when the lever 531 is moved to the position of FIGURE 8, the carriage 425a is moved upwardly as viewed in FIGURE 7 so that roller 421 constitutes the fulcrum point for the lever 410 so that the fulcrum point is disposed to the left of the center of gravity of the centrifugally responsive lever and plunger assembly.

*Operation*

When the propeller control lever 584 is in the forward thrust governing range, as indicated in FIGURE 1A, the speed sensitive governor including the centrifugal plunger 396, the lever 410 and the spring 416 control the flow of fluid under pressure to and from the pitch changing torque units. If the control lever 584 is moved in the counterclockwise direction within the forward governing range, the load on the spring 416 is reduced through cam 440 and the bellcrank 428 so as to reduce the speed setting of the governor. If the control lever 584 is moved in the clockwise direction as viewed in FIGURE 1A, the speed setting of the governor is increased. Normally, the propeller control lever 584 is maintained in a position wherein the speed setting of the governor is at the full rated speed during flight of the aircraft so that during flight of the aircraft the governor will maintain propeller speed substantially constant at 1040 r.p.m. If propeller speed should exceed 1040 r.p.m., the speed sensitive plunger 396 will move upwardly so as to actuate the servo distributor valve 370 so as to direct fluid under pressure to increase the pitch position of the propeller blades. Conversely, if propeller speed should fall below 1040 r.p.m. the speed sensitive plunger 396 will move downwardly thereby actuating the servo distributor valve 370 so as to direct fluid under pressure to the pitch change torque units to reduce the propeller pitch.

During governing operation in the forward thrust range, the solenoid valve 180 is connected in a parallel flow path with the servo distributor valve 370, the solenoid valve being energized by an electronic control system of the type disclosed in the aforementioned copending application Serial No. 630,234. In addition, in a multiple power plant aircraft, the speed setting of governor can be adjusted through the synchronizing control lever 488. Moreover, during governing operation in the forward thrust range, the roller 572 coacts with the cam surface 574 on the lever 410 to establish a minimum positive low pitch stop angle of the propeller blades in the forward thrust range. Thus, if the propeller should underspeed whereupon the governor will call for movement of the propeller blades in the decrease pitch direction towards a negative blade angle position, the feed-back gear 62 will actuate the feed-back shaft 98, and the feed-back shaft 98 will adjust the position of the roller 572 through the bellcrank 566 and the rod 562 so as to physically move the speed sensitive plunger 396 upwardly as viewed in FIGURE 1A when the propeller blades move below the angle of a positive 18°. Actuation of the speed sensitive plunger 396 and the lever 410 by the roller 572 will in turn actuate the servo distributor valve 370 so as to interrupt the application of fluid under pressure to the decrease pitch chamber of the torque units. Thus, the minimum positive low pitch angle in the forward thrust governing range is termed a hydraulic low pitch stop since the feed-back actuated roller 572 merely operates to mechanically position the speed sensitive plunger 396 so as to increase the pitch position of the propeller blades if the propeller blades move below a positive 18° when the propeller control lever 584 is in the forward thrust governing range.

The propeller can be feathered at any time by energizing the solenoid 230, the energization being controlled by the pilot through a suitable switch, not shown. When the solenoid 230 is energized, the valve plunger 226 is moved to the right, as viewed in FIGURE 1B thereby effecting a servo actuated shuttle valve 188 so as to move the shuttle valve 188 downwardly. When the shuttle valve 188 is moved downwardly the increase pitch conduit 38 is connected directly to the high pressure conduit 140 while the decrease pitch conduit 36 is connected to drain through port 208, passage 242, conduit 364 and conduit 120. At the same time, the shuttle valve 188 disconnects the high pressure conduit 140 from the conduit 223 which normally supplies high pressure fluid to the servo distributor valve 370. Thus, when the shuttle valve 188 is moved downwardly, the governor valve assembly is disconnected from the torque units. When the solenoid valve 230 is energized, the electric motor 109 for operating the feathering pump 108 is simultaneously energized to assume a sufficient supply of fluid under pressure to move the propeller blades to the feathering range.

The shuttle valve 188 can also be actuated to call for propeller feathering by movement of the selector valve 236 under the control of either rod 630 or rod 508. The rod 630 is operable to initiate propeller feathering at all times except when the propeller control lever 584 is in the beta or reverse governing ranges. When the rod 508 is moved to the left, as viewed in FIGURES 1A and 1B to call for propeller feathering, the feathering valve 358 is simultaneously actuated so as to connect the output of the pump 112 with the conduit 140 through the check valve 356. Moreover, when the control lever 584 is moved to the emergency feathering position, the speed sensitive plunger 396 is moved upwardly by the roller 572 through the rod 562 and the bellcrank 566 so as to actuate the servo distributor valve 370 to direct flow to the increase pitch chambers of the torque units. This arrangement constitutes a safety feature since if the shuttle valve 188 should fail to operate for any reason, the governor valve assembly can direct fluid under pressure to the increase pitch chambers of the toque units. However, as aforementioned, if the shuttle valve 188 moves downwardly as viewed in FIGURE 1B due to downward movement of the selector valve 236, the high pressure supply to the servo distributor valve will be cut off.

When a feathering operation is initiated, either manually or automatically, the toque units have their increase pitch chambers connected to the source of high pressure fluid and their decrease pitch chambers connected to drain. Accordingly, the propeller blades will be moved in the increase pitch direction, and when they arrive at a pitch angle in the feathering range, for instance, a positive 80°, the coacting lugs 90 and 92 are disengaged permitting the Belleville spring 94 to move the clutch member 84 into engagement with the ring gear 80. However, since the hydraulic pitch changing mechanism is capable of moving the propeller blades toward the full feathered position at a high pitch change rate, and since the hydraulic pitch changing mechanism can overpower the clutch member 84 to unfeather the propeller blades, as long as there is hydraulic pressure available for actuating the torque units, the clutch 84 will slip, or skid relative to the stationary ring gear 80. However, as soon as hydraulic actuation of the torque units terminates the clutch 84 will firmly engage the stationary gear 80, and will mechanically drive the propeller blades to the full feathered position upon propeller rotation in either direction.

When the propeller control lever 584 is moved into the beta range the valve 306 is actuated through rod 508 and lever 586 thereby releasing the mechanical low pitch stop and applying fluid under pressure to the servo chamber 594 to reset the governor spring 416 to the full rated r.p.m. of 1040. If the propeller speed is below 1040 r.p.m., the spring 416 will maintain the cam surface 574 of the lever 410 in engagement with the roller 572. Since the roller 572 is mechanically positioned through the cam 510 and the bellcrank 566 in the beta range, the pilot can select any angle between a positive 18° and a negative 15°, and when the angle selected by the pilot has been reached by the propeller blades the feed-back mechanism will reposition the roller 572 through the bellcrank 566 and the rod 562.

When the propeller control lever 584 is moved to the reverse governing range, the governor sense is reversed since the fulcrum means 420 is moved to the position of FIGURE 2. Concurrently, the roller 572 is moved out of operative engagement with the cam surface 574, and the roller 568 moves into operative position with respect to the cam surface 570 on the lever 410. During movement of the fulcrum 420, the speed sensitive piston 396 is moved downwardly through coaction of the roller 568 and the cam surface 570 whereupon the propeller blades will be moved into the negative thrust governing range wherein the minimum negative angle of —15° is established by the reverse governing hydraulic low pitch stop comprising roller 568 and the cam surface 570. If the propeller should overspeed when the control lever 584 is in the reverse governing range, the speed sensitive piston 396 will move downwardly, as viewed in FIGURE 2, since the force of the spring 416 acts on the lever 410 between the fulcrum 420 and the center of gravity denoted by numeral 412. Thus, during overspeeding in reverse thrust governing range, the lever 410 will pivot about the fulcrum 420 in the counterclockwise direction so as to move the speed sensitive plunger 396 downwardly thereby actuating the servo distributor valve 370 so as to apply pressure fluid to the torque units to move the propeller blades towards the maximum negative pitch position. Conversely, if the propeller should underspeed in the reverse thrust governing range, the lever 410 will pivot in a clockwise direction about the fulcrum 420 under the urge of spring 416 so as to move the speed sensitive plunger 396 upwardly thereby actuating the servo distributor valve 370 so as to direct pressure fluid to the torque units to move the propeller blades towards the minimum negative angle of 15°. The roller 568 coacts with the cam surface 570 as controlled by the feed-back mechanism to establish a hydraulic low pitch stop which prevents movement of the propeller blades towards a positive pitch position in response to propeller underspeeding when the propeller reaches an angle of a negative 15°.

While the embodiment of the invention as herein disclosed constitutes a preferred form, it is to be understood that other forms might be adopted.

What is claimed is as follows:

1. A control system for a variable pitch propeller having a plurality of propeller blades rotatable about their longitudinal axes between a maximum negative pitch angle and a fully feathered pitch angle including, fluid pressure operated motor means operatively connected to said blades for adjusting the pitch position thereof, a source of fluid under pressure, a speed sensitive governor, a valve operated by said governor for controlling the flow of fluid under pressure from said source to said pitch adjusting motor means, a manually operable control for said governor having a forward thrust constant speed governing position wherein the pitch position of said propeller blades can be adjusted between minimum and maximum positive angles and a reverse thrust constant speed governing position wherein the pitch position of said propeller blades can be adjusted between maximum and minimum negative angles, and means actuated by said manual control for reversing the sense of said governor during movement of said manually operable control from the forward thrust governing position to the reverse thrust governing position.

2. A control system for a variable pitch propeller operable in a forward thrust range between minimum and maximum positive pitch positions and a reverse thrust range between minimum and maximum negative pitch positions, including, fluid pressure operated motor means for adjusting propeller pitch, a speed sensitive governor, a valve operated by said governor for controlling the flow of fluid under pressure from said source to said pitch adjusting means, a manually operable control for said governor having a plurality of forward thrust speed governing positions and a reverse thrust constant speed governing position, means operable to vary the speed setting of said governor between predetermined limits in the forward thrust range, means actuated by said control for causing said governor to operate said valve so as to adjust propeller pitch towards the maximum positive pitch position in response to overspeeding of said propeller when said control is in any of said forward thrust governing positions, a reverse thrust range selector operable by said control for reversing the sense of said governor to cause said governor to operate said valve so as to adjust the propeller position towards the maximum negative pitch position in response to overspeeding of said propeller when said control is in the reverse thrust governing position, and means actuated by said control during movement thereof between the forward and reverse thrust governing positions for effecting operation of said valve irrespective of said governor for applying pressure fluid to said motor means to adjust propeller pitch from the forward thrust range to the reverse thrust range.

3. A control system for a variable pitch propeller having blades rotatable about their longitudinal axes between a maximum negative pitch position and a fully feathered pitch position including, fluid pressure operated motor means operatively connected with said blades for adjusting the pitch position thereof, a source of fluid under pressure, a valve connected between said source and said motor means for controlling the flow of fluid under pressure from said source to said motor means, a speed sensitive governor for operating said valve, adjustable means constituting a part of said governor having a first position wherein said governor operates said valve so as to increase the positive pitch setting of said blades during propeller overspeeding, and means for adjusting said last recited means to reverse the sense of the governor whereby said governor will operate said valve so as to increase the negative pitch setting of said blades in response to the propeller overspeeding.

4. A control system for a variable pitch propeller having blades rotatable about their longitudinal axes between a maximum negative pitch position and a fully feathered pitch position, including, fluid pressure operated motor means operatively connected with said blades for adjusting the pitch position thereof, a source of fluid under pressure, a valve connected between said source and said motor means for controlling the flow of pressure fluid therebetween, a speed sensitive governor for operating said valve, adjustable means constituting a part of said governor having a first position wherein said governor operates said valve to adjust the pitch position of said baldes towards the feathered position during propeller overspeeding, means for adjusting said last recited means to a second position wherein said governor operates said valve to adjust the pitch position of said blades towards the maximum negative pitch position in response to propeller overspeeding, and means actuated concurrently with adjustment of said first recited means between said first and second positions for overriding said governor and actuating said valve to effect movement of said blades from a positive pitch position to a negative pitch position.

5. A variable pitch propeller including, a hub having a plurality of propeller blades journalled therein for rotation about their longitudinal axes between a maximum negative pitch position and a fully feathered pitch position, means disposed within said hub and rotatable about the horizontal propeller axis, said means being operatively connected to said blades and having a definite angular position relative to said hub for each pitch position of said propeller blades, a stationary support shaft, bearing means journalling said hub for rotation relative to said stationary support shaft, fluid pressure operated motor means carried by said hub and operatively connected to said blades for adjusting the pitch position thereof, and means automatically operable to couple said first recited means to said stationary shaft when said propeller blades are moved to a predetermined high positive pitch position whereby further rotation of said propeller hub will cause said blades to be mechanically driven to the fully feathered position through said first recited means.

6. A variable pitch propeller including, a hub having a plurality of propeller blades journalled therein for rotation about their longitudinal axes between a maximum negative pitch position and a fully feathered pitch position, fluid pressure operated motor means carried by said hub and operatively connected to said blades for adjusting the pitch position thereof, a master gear assembly journalled in said hub for rotation relative thereto and operatively connected to said blades for coordinating the pitch adjusting movement thereof, said master gear assembly having a definite angular position relative to the hub for each pitch position of said propeller blades, a stationary support shaft, bearing means journalling said hub for rotation relative to said stationary support shaft, an element connected to rotate with said master gear assembly but capable of axial movement relative thereto when the propeller blades are in the feathering range, and resilient means automatically operable to effect axial movement of said element into engagement with said stationary support shaft so as to restrain rotation of said master gear assembly whereby any rotation of said propeller hub will cause said blades to be mechanically driven to the fully feathered position through said master gear assembly.

7. The propeller set forth in claim 6 including means for precluding axial movement of said element relative to said hub when the propeller blades are not in the feathering range comprising coengaging abutments on said hub and said element.

8. A variable pitch propeller including, a hub having a plurality of propeller blades journalled therein for rotation about their longitudinal axes between a maximum negative pitch position and a fully feathered pitch position, fluid pressure operated motor means operatively connected to said blades for adjusting the pitch position thereof, a stationary support shaft, bearing means journalling said hub for rotation relative to said support shaft, a regulator reservoir attached to said hub for rotation therewith, pump means disposed within said regulator reservoir energized incident to propeller rotation for developing a source of fluid under pressure, valve means in said regulator reservoir for controlling the application of pressure fluid from said source to said motor means to adjust the pitch position of said blades, a feathering reservoir attached to said hub, a pump disposed within said feathering reservoir energized incident to relative rotation between said hub and said stationary support shaft, an unloading valve disposed within said regulator reservoir for normally by-passing the output of the pump in said feathering reservoir back to the feathering reservoir, and means operable to actuate said unloading valve to connect the output of said pump with the output of the pump means in said regulator reservoir and direct the combined output thereof to said motor means to move the propeller blades towards the feathered pitch position.

9. A control system for a variable pitch propeller having blades rotatable about their longitudinal axes between a maximum negative pitch position and a fully feathered pitch position including, fluid pressure operated motor means operatively connected with said blades for adjusting the pitch position thereof, a source of fluid under pressure, a valve connected between said source and said motor means for controlling the flow of pressure fluid therebetween, a speed sensitive governor valve for operating said valve, adjustable means constituting a part of said governor having a first position wherein said governor operates said valve to increase the positive pitch position of said blades during propeller overspeeding, fluid pressure operated stop means for determining the minimum positive pitch position of said blades when said adjustable means is in said first position, and means for moving said adjustable means to a second position wherein said governor operates said valve to increase the negative pitch position of said blades in response to propeller overspeeding.

10. A control system for a variable pitch propeller having blades rotatable about their longitudinal axes between a maximum negative pitch position and a fully feathered pitch position including, fluid pressure operated motor means operatively connected with said blade for adjusting the pitch position thereof, a source of fluid under pressure, a valve connected between said source and said motor means for controlling the flow of pressure fluid therebetween, a speed sensitive governor for operating said valve, adjustable means constituting a part of said governor having a first position wherein said governor operates said valve to increase the positive pitch position of said blades in response to propeller overspeeding, means for moving said adjustable means to a second position wherein said governor operates said valve to increase the negative pitch position of said blades in response to propeller overspeeding, and fluid pressure operated stop means for determining the minimum negative pitch position of said blades when said adjustable means is in said second position.

11. A control system for a variable pitch propeller having blades rotatable about their longitudinal axes between a maximum negative pitch position and a fully feathered pitch position, fluid pressure operated motor means operatively connected with said blades for adjusting the pitch position thereof, a source of fluid under pressure, a valve connected between said source and said motor for controlling the flow of pressure fluid therebetween, a speed sensitive governor for operating said valve, adjustable means constituting a part of said governor having a first position wherein said governor operates to increase the positive pitch position of said blades during propeller overspeeding, first fluid operated stop means for determining the minimum positive pitch position of said blades when said adjustable means is in said first position, means for moving said adjustable means to a second position wherein said governor operates said valve to increase the negative pitch position of said blades in response to propeller overspeeding, and second fluid pressure operated stop means for determining the minimum negative pitch position of said blades when said adjustable means is in said second position.

12. A governor assembly for a variable pitch propeller including, a centrifugally responsive lever, a centrifugally responsive control element pivotally connected to said lever, said lever and said control element constituting a centrifugally responsive mass having a fixed center of gravity, resilient means acting on said lever at a point spaced from the center of gravity of said mass for opposing movement of said mass under the urge of centrifugal force, adjustable fulcrum means for said lever having a first position wherein the center of gravity of said mass is disposed between the point at which said resilient means acts and said fulcrum means whereby said control element and lever will move in one direction about said fulcrum means when the thrust of centrifugal force exceeds the opposing force of said resilient means, and means for moving said fulcrum means to a second position wherein the point at which said resilient means acts on said lever is disposed between the center of gravity of said mass and said fulcrum means whereby said control element and lever will move in the opposite direction about said fulcrum means when the thrust of centrifugal force exceeds the opposing force of said resilient means.

13. The governor assembly set forth in claim 12 wherein said lever has an elongated closed slot therein, and wherein said fulcrum means comprise roller means disposed within said slot and movable relative thereto.

14. The governor assembly set forth in claim 12 wherein said lever has a pair of spaced cam surfaces disposed on opposite sides of the center of gravity of said means, and roller means engageable with each of said cam surfaces for limiting movement of said control element and said lever when the force of said resilient means exceeds the thrust of centrifugal force.

15. A governor assembly for a variable pitch propeller including, a centrifugally responsive mass having a fixed center of gravity, resilient means acting on said mass at a point spaced from the center of gravity thereof for opposing movement of said mass under the urge of centrifugal force, adjustable fulcrum means for said mass having a first position wherein the center of gravity of said mass is disposed between the point at which said resilient means acts and said fulcrum means whereby said mass will move in one direction about said fulcrum means when the thrust of centrifugal force exceeds the opposed force of said resilient means, and means for moving said fulcrum means to a second position wherein the point at which said resilient means acts on said mass is disposed between the center of gravity of said mass and said fulcrum means whereby said mass will move in the opposite direction about said fulcrum means when the thrust of centrifugal force exceeds the opposed force of said resilient means.

16. A variable pitch propeller including, in combination, a hub having a plurality of blades journalled therein for rotation about their longitudinal axes to different pitch positions, fluid pressure operated motor means operatively connected with said blades for adjusting the pitch position thereof, a source of fluid under pressure, a servo actuated distributor valve connected between said source and said motor means for controlling the flow of pressure fluid therebetween, a speed sensitive governor for controlling the actuation of said distributor valve including a centrifugally responsive speed sensitive valve element, a centrifugally responsive lever pivotally connected thereto, said valve element and lever constituting a centrifugally responsive mass having a fixed center of gravity, resilient means acting on said lever at a point spaced from said center of gravity and adjustable fulcrum means for said lever, manually operable means for controlling the position of said fulcrum means having a first position wherein said center of gravity is disposed between the point at which said resilient means acts and said fulcrum means whereby said speed sensitive valve element will actuate said distributor valve to increase the positive pitch position of said propeller blades in response to propeller overspeeding, and means actuated upon movement of said manually operable means to a second position for adjusting said fulcrum means so that the point at which said resilient means acts is disposed between said fulcrum means and the center of gravity whereby said speed sensitive valve element will actuate said distributor valve to increase the negative pitch position of said propeller blades in response to propeller overspeeding.

17. The variable pitch propeller set forth in claim 16 wherein the means for adjusting the position of said fulcrum means comprises a fluid pressure operated servo motor.

18. A variable pitch propeller including, in combination, a hub having a plurality of blades journalled therein for rotation about their longitudinal axes to different pitch positions, fluid pressure operated motor means operatively connected with said blades for adjusting the pitch position thereof, a source of fluid under pressure, a servo actuated distributor valve connected between said source and said motor means for controlling the flow of pressure fluid therebetween, a speed sensitive governor for actuating said distributor valve to maintain propeller speed substantially constant in either a forward thrust range or a reverse thrust range, adjustable means constituting a part of said governor having a first position wherein said governor actuates said distributor valve to maintain propeller speed substantially constant in the forward thrust range, and means for adjusting said last recited means to reverse the sense of the governor whereby the governor will actuate said distributor valve to maintain propeller speed substantially constant in the reverse thrust range.

19. The propeller set forth in claim 18 wherein said governor includes a speed sensitive valve element, and wherein said propeller includes intermittently actuated feed-back means driven by said propeller blades during movement thereof between a minimum negative pitch position and a minimum positive pitch position, and means interconnecting said feed-back means and said valve element for actuating said valve element to establish a fluid pressure operated stop at the minimum positive position in the forward thrust range and the minimum negative pitch position in the reverse thrust range.

20. The propeller set forth in claim 19 wherein the means for establishing said fluid pressure operated stops comprises cooperating cam and roller elements, and wherein the propeller includes means for manually positioning one of said elements for selecting a pitch position of the propeller blades between the minimum positive pitch position and the minimum negative pitch position.

References Cited in the file of this patent

UNITED STATES PATENTS

| | | |
|---|---|---|
| 1,127,012 | Kagi | Feb. 2, 1915 |
| 1,410,463 | Funk et al. | Mar. 21, 1922 |
| 1,875,598 | Heath | Sept. 6, 1932 |
| 2,678,103 | Martin | May 11, 1954 |
| 2,748,877 | Miller et al. | June 5, 1956 |